(12) United States Patent
Yoshioka et al.

(10) Patent No.: US 12,126,453 B2
(45) Date of Patent: Oct. 22, 2024

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Yanru Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 377 days.

(21) Appl. No.: 17/619,966

(22) PCT Filed: Jun. 24, 2019

(86) PCT No.: PCT/JP2019/025017
§ 371 (c)(1),
(2) Date: Dec. 16, 2021

(87) PCT Pub. No.: WO2020/261350
PCT Pub. Date: Dec. 30, 2020

(65) Prior Publication Data
US 2022/0360374 A1    Nov. 10, 2022

(51) Int. Cl.
*H04L 1/18* (2023.01)
*H04L 1/1829* (2023.01)
*H04W 72/04* (2023.01)
*H04W 72/23* (2023.01)

(52) U.S. Cl.
CPC ........... *H04L 1/1861* (2013.01); *H04W 72/23* (2023.01)

(58) Field of Classification Search
CPC ... H04L 1/1812; H04L 1/1854; H04L 1/1861; H04L 1/1896; H04L 5/0055; H04W 72/0406; H04W 72/0413; H04W 72/042; H04W 92/18
See application file for complete search history.

(56) References Cited

U.S. PATENT DOCUMENTS

2020/0351833 A1* 11/2020 Chae ..................... H04W 72/04
2020/0351859 A1* 11/2020 Chae ................. H04W 72/0446
2021/0321363 A1* 10/2021 Belleschi .......... H04W 72/0446
(Continued)

FOREIGN PATENT DOCUMENTS

CN          109792594 A        5/2019

OTHER PUBLICATIONS

Extended European Search Report issued in counterpart European Patent Application No. 19934536.4, mailed on Dec. 14, 2022 (12 pages).

(Continued)

*Primary Examiner* — Alpus Hsu
(74) *Attorney, Agent, or Firm* — Osha Bergman Watanabe & Burton LLP

(57) ABSTRACT

A terminal includes a receiving unit configured to receive a signal from a base station; a control unit configured to configure a periodic sidelink resource for transmitting data on sidelink based on the signal received by the receiving unit, and to configure an uplink control channel resource for transmitting, to the base station, a first Hybrid Automatic Repeat Request (HARQ)-Acknowledgement (ACK) corresponding to a HARQ-ACK of a sidelink communication received by the receiving unit; and a transmitting unit configured to transmit the first HARQ-ACK on the uplink control channel resource configured by the control unit.

9 Claims, 22 Drawing Sheets

(56) References Cited

U.S. PATENT DOCUMENTS

| | | | | |
|---|---|---|---|---|
| 2021/0321380 A1* | 10/2021 | Zhao | ...................... | H04L 1/1896 |
| 2021/0385845 A1* | 12/2021 | Zhao | ...................... | H04L 1/1854 |
| 2022/0007403 A1* | 1/2022 | Li | ...................... | H04W 72/20 |
| 2022/0094481 A1* | 3/2022 | Hong | ...................... | H04L 1/1812 |
| 2022/0159692 A1* | 5/2022 | Lee | ...................... | H04L 5/0053 |
| 2022/0321278 A1* | 10/2022 | Yoshioka | .............. | H04L 1/1854 |

OTHER PUBLICATIONS

Samsung; "On Uu-based resource allocation and configuration"; 3GPP TSG RAN WG1 Ad-Hoc Meeting 1901, R1-1901060; Taipei, Taiwan; Jan. 21-25, 2019 (7 pages).
Fujitsu; "Discussion on HARQ-ACK feedback for NR-V2X"; 3GPP TSG RAN WG1 Ad-Hoc Meeting 1901, R1-1900248; Taipei, Taiwan; Jan. 21-25, 2019 (8 pages).
Samsung; "Considerations on Sidelink HARQ Procedure"; 3GPP TSG RAN WG1 #96, R1-1902278; Athens, Greece; Feb. 25-Mar. 1, 2019 (11 pages).
Office Action issued in counterpart Japanese Patent Application No. 2021-528672 mailed on Apr. 25, 2023 (5 pages).
International Search Report issued in PCT/JP2019/025017 on Dec. 10, 2019 (3 pages).
Written Opinion of the International Searching Authority issued in PCT/JP2019/025017 on Dec. 10, 2019 (4 pages).
Lenovo, Motorola Mobility; "Discussion on resource allocation for NR sidelink Mode 1"; 3GPP TSG RAN WG1 #97, R1-1906268; Reno, USA; May 13-17, 2019 (4 pages).
OPPO; "Mode 1 resource allocation for NR SL"; 3GPP TSG RAN WG1 #96bis, R1-1904918; Xi'an, China; Apr. 8-12, 2019 (5 pages).
3GPP TS 38.214 V15.5.0; "3rd Generation Partnership Project; Technical Specification Group Radio Access Network; NR; Physical layer procedures for data (Release 15)"; Mar. 2019 (103 pages).
Office Action issued in counterpart European Patent Application No. 19 934 536.4 mailed on Jan. 30, 2024 (6 pages).
Office Action issued in counterpart Korean Patent Application No. 10-2021-7039464 mailed on Feb. 28, 2024 (8 pages).
Ericsson; "Uu-based sidelink resource allocation"; 3GPP TSG-RAN WG1 Meeting #97, R1-1907135; Reno, US; May 13-17, 2019 (8 pages).
Fujitsu; "Discussion on HARQ-ACK feedback for NR-V2X"; 3GPP TSG RAN WG1 #96, R1-1901944; Athens, Greece; Feb. 25-Mar. 1, 2019 (8 pages).
Zte et al; "Discussion on PHY procedures for NR V2X"; 3GPP TSG RAN WG1 Ad-Hoc Meeting 1901, R1-1900775; Taipei; Jan. 21-25, 2019 (7 pages).

* cited by examiner

TERMINAL AND COMMUNICATION METHOD

TECHNICAL FIELD

The present invention relates to a terminal and a communication method in a radio communication system.

BACKGROUND ART

In Long Term Evolution (LTE), successor systems of LTE (for example, LTE Advanced (LTE-A), and New Radio (NR) (also called 5G)), technology of sidelink (device to device (D2D)) has been studied in which terminals, such as a user equipment (UE), perform communication directly with each other without going through a base station.

Furthermore, implementation of vehicle to everything (V2X) has been studied, and a technical specification has been developed. Here, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to nomadic device (V2N) meaning a communication mode performed between a vehicle and a mobile terminal of a driver, and vehicle to pedestrian (V2P) meaning a communication mode performed between a vehicle and a mobile terminal of a pedestrian as illustrated in FIG. 1.

RELATED ART DOCUMENT

Non-Patent Document

Non-Patent Document 1: 3GPP TS 38.214 V15.5.0 (2019 March)

SUMMARY OF THE INVENTION

Problem to be Solved by the Invention

For an SL transmission mode 1 specified in NR V2X, it is assumed that a transmitting terminal transmits HARQ-ACK corresponding to Sidelink HARQ-ACK to a base station (gNB). More specifically, for example, a base station performs scheduling for a terminal, and a transmitting terminal transmits data on PSCCH/PSSCH to a receiving terminal. The receiving terminal performs feedback of the data transmission on PSCCH/PSSCH to the transmitting terminal, and based on this, the transmitting terminal performs HARQ-ACK feedback to the base station 10.

There is a need for clarifying an operation for transmitting HARQ-ACK from a terminal to a base station when configured grant is applied and sidelink HARQ is applied in SL transmission mode 1 specified in NR V2X.

Means for Solving the Problem

According to an aspect of the present invention, there is provided a terminal including a receiving unit configured to receive a signal from a base station, a control unit configured to configure a periodic sidelink resource for transmitting data on sidelink based on the signal received by the receiving unit, and to configure an uplink control channel resource for transmitting, to the base station, a first Hybrid Automatic Repeat Request (HARQ)-Acknowledgement (ACK) corresponding to a HARQ-ACK of a sidelink communication received by the receiving unit, and a transmitting unit configured to transmit the first HARQ-ACK on the uplink control channel resource configured by the control unit.

Advantage of the Invention

According to an embodiment, an operation for transmitting HARQ-ACK from a terminal to a base station is clarified when a configured grant is applied and sidelink HARQ is applied in SL transmission mode 1.

BRIEF DESCRIPTION OF DRAWINGS

FIG. 8B is a diagram illustrating an outline of SL transmission mode 2a.

EMBODIMENTS OF THE INVENTION

In the following, embodiments of the present invention are described with reference to the appended drawings. The embodiments described below are merely an example, and embodiments to which the present invention is applied are not limited to the following embodiments.

In the embodiments, it is assumed that a direct communication scheme between terminals is LTE sidelink (SL) or NR SL, but the direct communication method is not limited to this method. Furthermore, the name "sidelink" is an example, and uplink (UL) may include a function of SL without using the name "sidelink." The SL may be distinguished from downlink (DL) or UL by a difference in a frequency or time resource or may be another name.

Furthermore, UL and SL may be distinguished by a difference of one or more combinations of a time resource, a frequency resource, a time/frequency resource, a reference signal to be referred to so as to determine a path loss in transmission power control, and a reference signals (PSS/SSS/PSSS/SSSS) used for synchronization.

For example, in UL, a reference signal of an antenna port X_ANT is used as the reference signal to be referred to so as to determine the path loss in the transmission power control, and in SL (including UL used as SL), a reference signal of an antenna port Y_ANT is used as the reference signal to be referred to so as to determine the path loss in the transmission power control.

Furthermore, in the embodiments, a configuration in which a terminal (which may be referred to as a user equipment (UE)) is installed in a vehicle is mainly assumed, but an embodiment of the present invention is not limited to this configuration. For example, a terminal may be a terminal carried by a person, a terminal may be a drone or a device installed in an aircraft, and a terminal may be a base station, an RSU, a relay station (relay node), a user equipment provided with scheduling capability, or the like.

(Overview of Sidelink)

In the embodiment, since sidelink is a basic technique used here, first, an overview of sidelink is described as a basic example. An example of a technique described here is a technique specified in Rel. 14 of 3GPP or the like. This technique may be used in NR, or a technique different from this technique may be used in NR. A sidelink communication may be defined to be a direct communication performed among two or more neighboring units of user equipment by using E-UTRA technology, without going through a network node. A sidelink may be defined to be an interface between units of user equipment in a sidelink communication.

Figure 1:
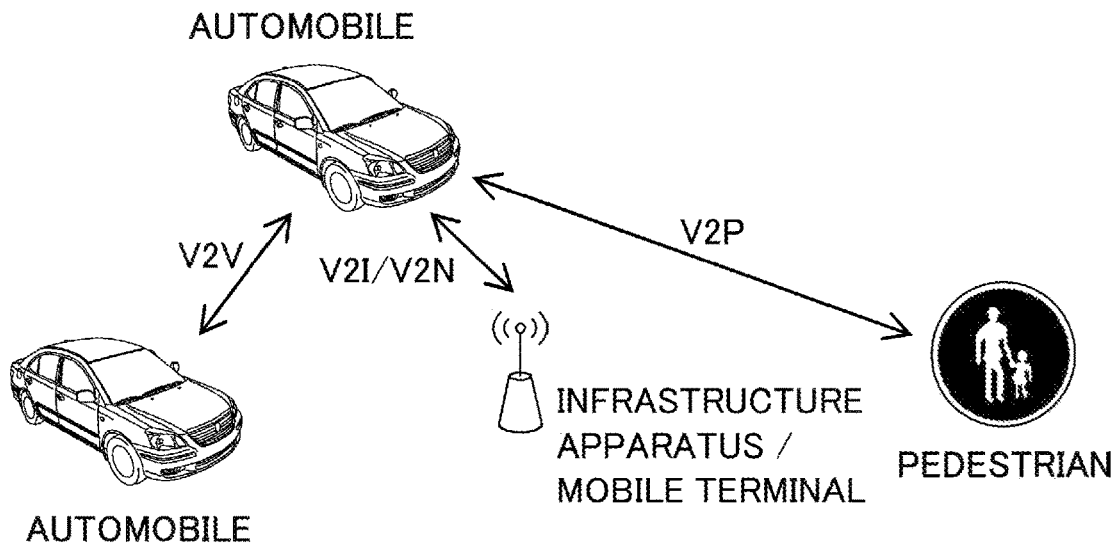
FIG. 1 is a diagram for illustrating V2X.
Figure 2A:
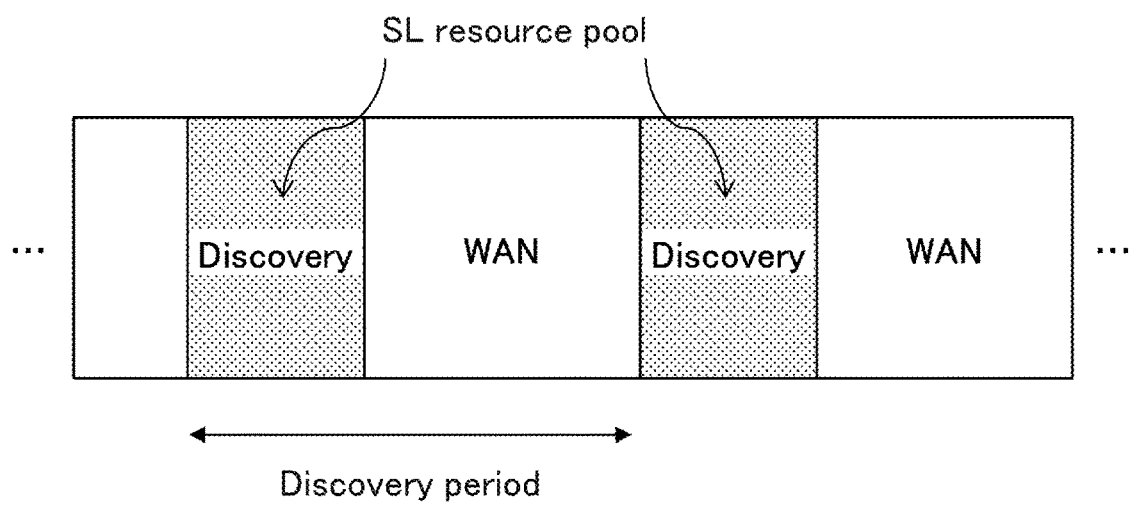
FIG. 2A is a diagram for illustrating sidelink.

Sidelink is roughly divided into "discovery" and "communication." For "discovery," as illustrated in FIG. 2A, a discovery message resource pool is configured for each discovery period, and a terminal (referred to as a UE) transmits a discovery message (discovery signal) within the resource pool. More specifically, there are Type 1 and Type 2b. In Type 1, a terminal autonomously selects a transmission resource from the resource pool. In Type 2b, a quasi-static resource is allocated by higher layer signaling (for example, an RRC signal).

Figure 2B:
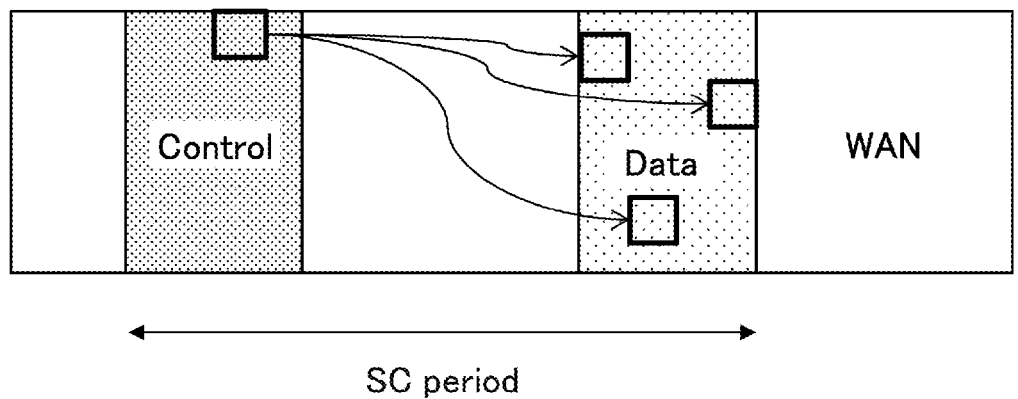
FIG. 2B is a diagram for illustrating sidelink.

For "communication," as illustrated in FIG. 2B, a sidelink control information (SCI)/data transmission resource pool is periodically configured for each Sidelink Control (SC) period. A terminal on a transmission side notifies a reception side of a data transmission resource (PSSCH resource pool) or the like through the SCI with the resource selected from the control resource pool (PSCCH resource pool), and transmits data with the data transmission resource. For "communication," in further detail, there are a mode 1 and a mode 2. In the mode 1, resources are dynamically allocated by an (enhanced) physical downlink control channel ((E)PDCCH) transmitted from a base station to a terminal. In the mode 2, a terminal autonomously selects a transmission resource from the resource pool. For example, the resource pool is provided by notification through SIB, for example, and is predefined.

In Rel-14, in addition to the mode 1 and the mode 2, there are a mode 3 and a mode 4. In Rel-14, SCI and data can be transmitted simultaneously (in one sub frame) with resource blocks that are adjacent in a frequency direction. The SCI is also referred to as scheduling assignment (SA).

A channel used for "discovery" is referred to as a physical sidelink discovery channel (PSDCH), a channel for transmitting control information such as the SCI in "communication" is referred to as a physical sidelink control channel (PSCCH), and a channel for transmitting data is referred to as a physical sidelink shared channel (PSSCH). The PSCCH and the PSSCH have a PUSCH-based structure and have a structure in which a demodulation reference signal (DMRS) is inserted. In this specification, a PSCCH may be referred to as a sidelink control channel, and a PSSCH may be referred to as a sidelink shared channel. A signal transmitted through a PSCCH may be referred to as a sidelink control signal, and a signal transmitted through a PSSCH may be referred to as a sidelink data signal.

Figure 3:
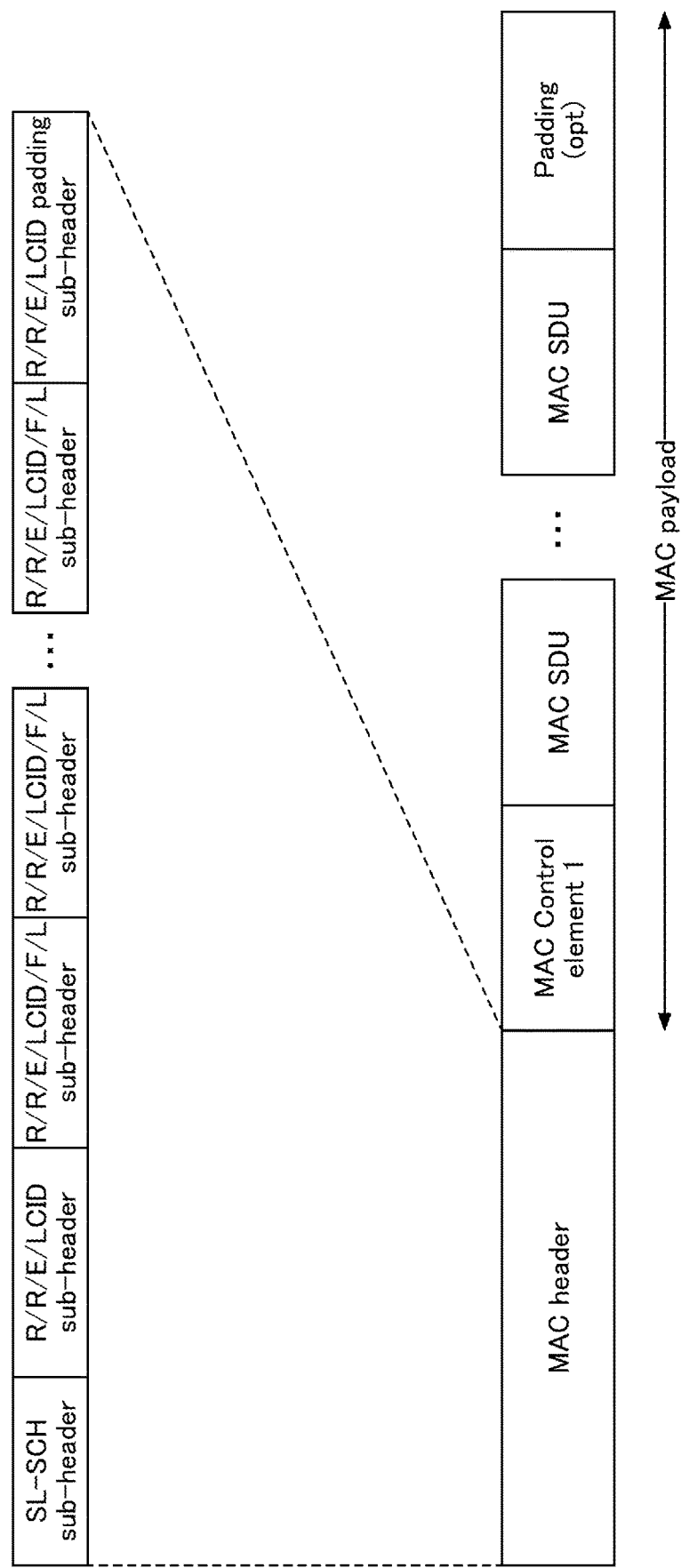
FIG. 3 is a diagram for illustrating a MAC PDU used for sidelink communication.

As illustrated in FIG. 3, a medium access control (MAC) protocol data unit (PDU) used for sidelink includes at least a MAC header, a MAC control element, a MAC service data unit (SDU), and padding. The MAC PDU may include other information. The MAC header includes one a sidelink shared channel (SL-SCH) subheader and one or more MAC PDU subheaders.

Figure 4:
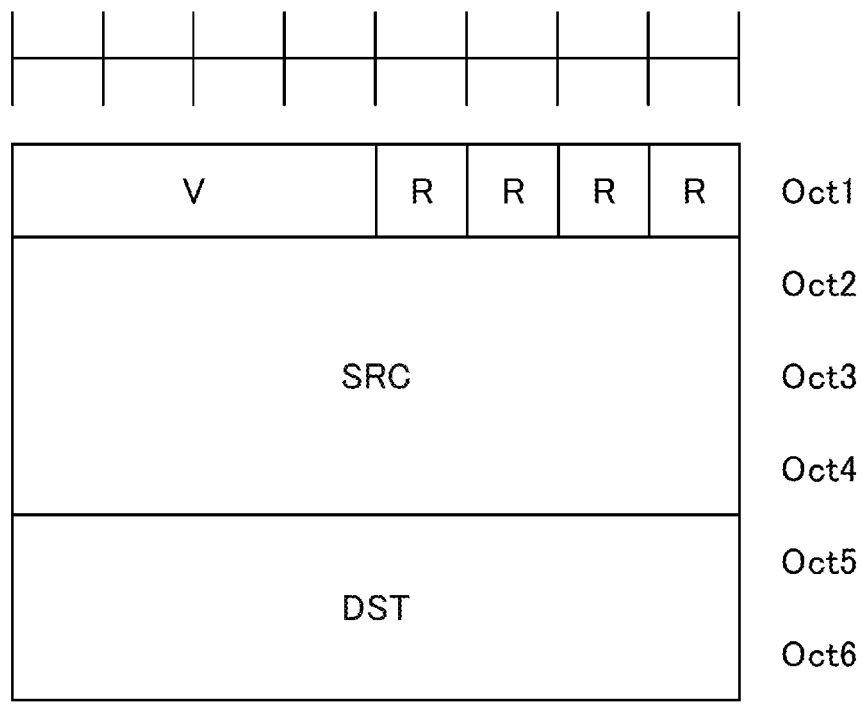
FIG. 4 is a diagram for illustrating a format of an SL-SCH subheader.

As illustrated in FIG. 4, the SL-SCH subheader includes a MAC PDU format version (V), transmission source information (SRC), transmission destination information (DST), reserved bits (R), and the like. V is allocated to the head of the SL-SCH subheader and indicates the MAC PDU format version used by the terminal. Information related to a transmission source is configured in the transmission source information. An identifier related to a ProSe UE ID may be configured in the transmission source information. Information related to a transmission destination is configured in the transmission destination information. Information related to a ProSe Layer-2 Group ID of the transmission destination may be configured in the transmission destination information.

Figure 5:
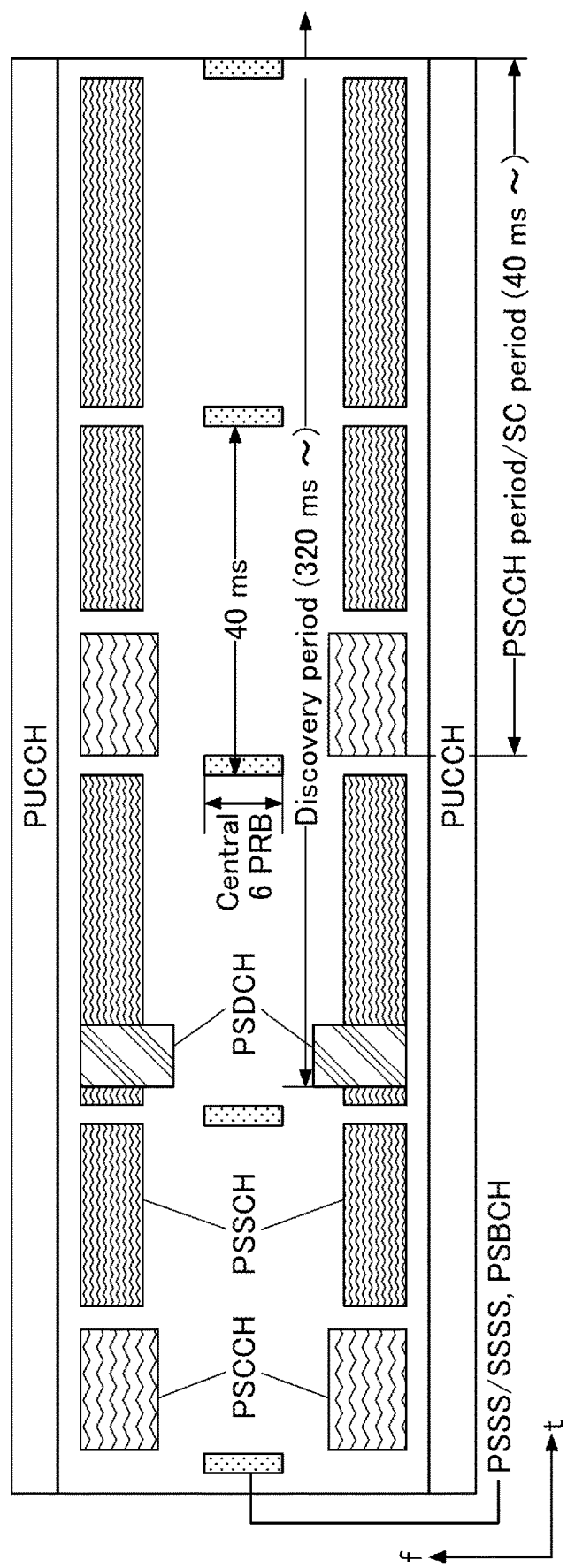
FIG. 5 is a diagram for illustrating an example of a channel structure used in LTE-V2X sidelink.

An example of a channel structure of LTE-V2X sidelink is illustrated in FIG. 5. As illustrated in FIG. 5, the resource pool of the PSCCH used for "communication" and the resource pool of the PSSCH are allocated. Furthermore, the resource pool of the PSDCH used for "discovery" is allocated at a period longer than a period of a channel of "communication." Note that the PSDCH need not be included for NR-V2X.

A Primary Sidelink Synchronization signal (PSSS) and a secondary sidelink synchronization signal (SSSS) are used as synchronization signals for sidelink. For example, a physical sidelink broadcast channel (PSBCH) for transmitting broadcast information such as a system band of sidelink, a frame number, and resource configuration information is used for an operation outside a coverage. The PSSS/SSSS and the PSBCH are transmitted, for example, in one sub frame. The PSSS/SSSS is also referred to as an SLSS.

V2X assumed in the embodiments is a method related to "communication." However, in the embodiments, there may be no distinction between "communication" and "discovery." Furthermore, the technology according to the embodiments may be applied in "discovery."

(System Configuration)

Figure 6:
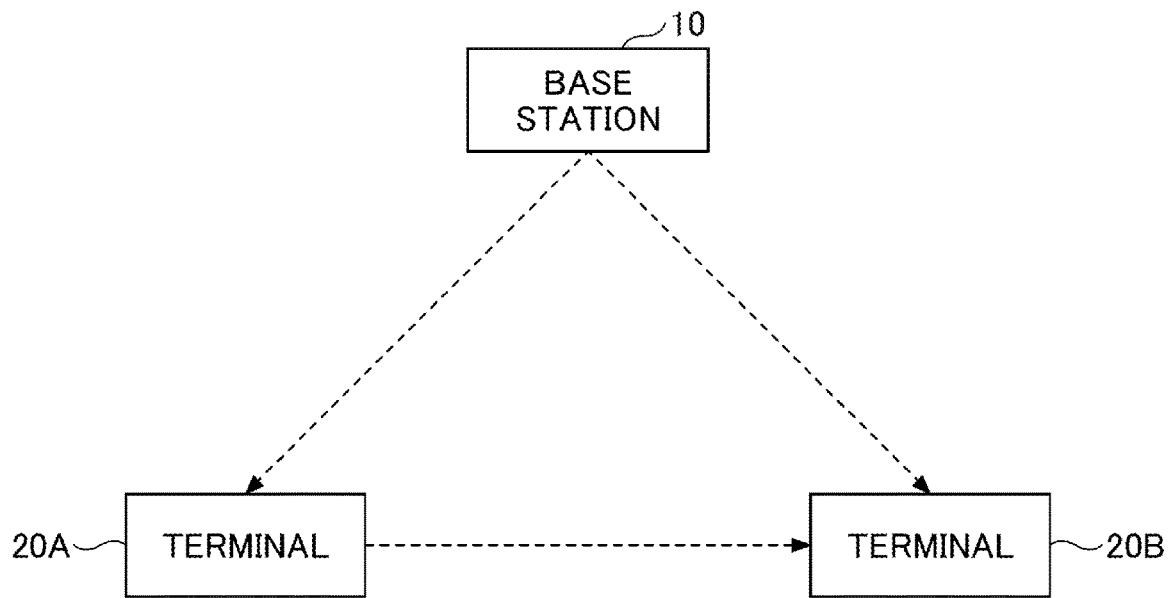
FIG. 6 is a diagram indicating an example of a configuration of a radio communication system according to an embodiment.

FIG. 6 is a diagram illustrating a configuration example of a radio communication system according to the embodiments. As illustrated in FIG. 6, the radio communication system according to the embodiments includes a base station 10, a terminal 20A, and a terminal 20B. Note that, actually, there may be many terminals, but FIG. 6 illustrates the terminal 20A and the terminal 20B as an example.

In FIG. 6, it is intended that the terminal 20A is the transmission side, the terminal 20B is the reception side, but both the terminal 20A and the terminal 20B have both the transmission function and the reception function. Hereinafter, when it is not necessary to particularly distinguish the terminals 20A and 20B, they are referred to simply as a "terminal 20" or a "terminal." FIG. 6 illustrates a case in which the terminal 20A and the terminal 20B are both in the coverage as an example, but an operation according to the embodiments can be applied to a case in which all the terminals 20 are within the coverage, a case in which some terminals 20 are within the coverage whereas the other terminals 20 are outside the coverage, and a case in which all the terminals 20 are outside the coverage.

In the embodiments, the terminal 20 is a device installed in a vehicle such as, for example, an automobile and has a cellular communication function as a UE in LTE or NR and a sidelink function. Furthermore, the terminal 20 has a function of acquiring report information (position, event information, or the like) as in a GPS device, a camera, or various types of sensors. Furthermore, the terminal 20 may be a general mobile terminal (such as a smartphone). Furthermore, the terminal 20 may be an RSU. The RSU may be a UE type RSU having a function of a UE, a BS type RSU (which is also referred to as a gNB type UE) having a function of a base station, or a relay station.

The terminal 20 need not be a device of one housing, and for example, even when various types of sensors are distributed and arranged in a vehicle, a device including various types of sensors is the terminal 20. Furthermore, the terminal 20 may have a function of performing transmission and reception of data with various types of sensors without including various types of sensors.

Furthermore, processing of sidelink transmission of the terminal 20 is basically the same as processing of UL transmission in LTE or NR. For example, the terminal 20 scrambles and modulates codewords of transmission data, generates complex-valued symbols, maps the complex-valued symbols (transmission signals) to one or two layers, and performs precoding. Then, the precoded complex-valued symbols are mapped to resource elements, and a transmission signal (for example, CP-OFDM or a DFT-s-OFDM) is generated and transmitted from each antenna port.

The base station 10 has a cellular communication function as a base station 10 in LTE or NR and a function (for example, resource pool configuring, resource allocation, and the like) for enabling communication of the terminal 20 in the embodiments. Furthermore, the base station 10 may be an RSU (a gNB type RSU), a relay station, or a terminal provided with a scheduling function.

Furthermore, in the radio communication system according to the embodiments, a signal waveform used for SL or UL by the terminal 20 may be an OFDMA, an SC-FDMA, or any other signal waveform. Furthermore, in the radio communication system according to the embodiments, as an example, a frame including a plurality of sub frames (for example, 10 sub frames) is formed in a time direction, and it includes a plurality of subcarriers in a frequency direction. One sub frame is an example of one transmission time interval (TTI). Here, the TTI is not necessarily a sub frame. For example, the TTI may be a slot, a mini-slot, or any other unit in the time domain. Furthermore, the number of slots per sub frame may be determined in accordance with the subcarrier spacing. Furthermore, the number of symbols per slot may be 14 symbols.

In the embodiments, the terminal 20 can operate in any mode among a mode 1 which is a mode in which resources are dynamically allocated by the ((enhanced) physical downlink control channel ((E) PDCCH) transmitted from the base station 10 to the terminal, a mode 2 which is a mode in which the terminal autonomously selects a transmission resource from a resource pool, a mode in which resource for SL signal transmission is allocated from the base station 10 (hereinafter referred to as a mode 3), and a mode in which a resource for SL signal transmission is autonomously selected (hereinafter referred to as a mode 4). The mode is configured, for example, in the terminal 20 from the base station 10.

Figure 7:
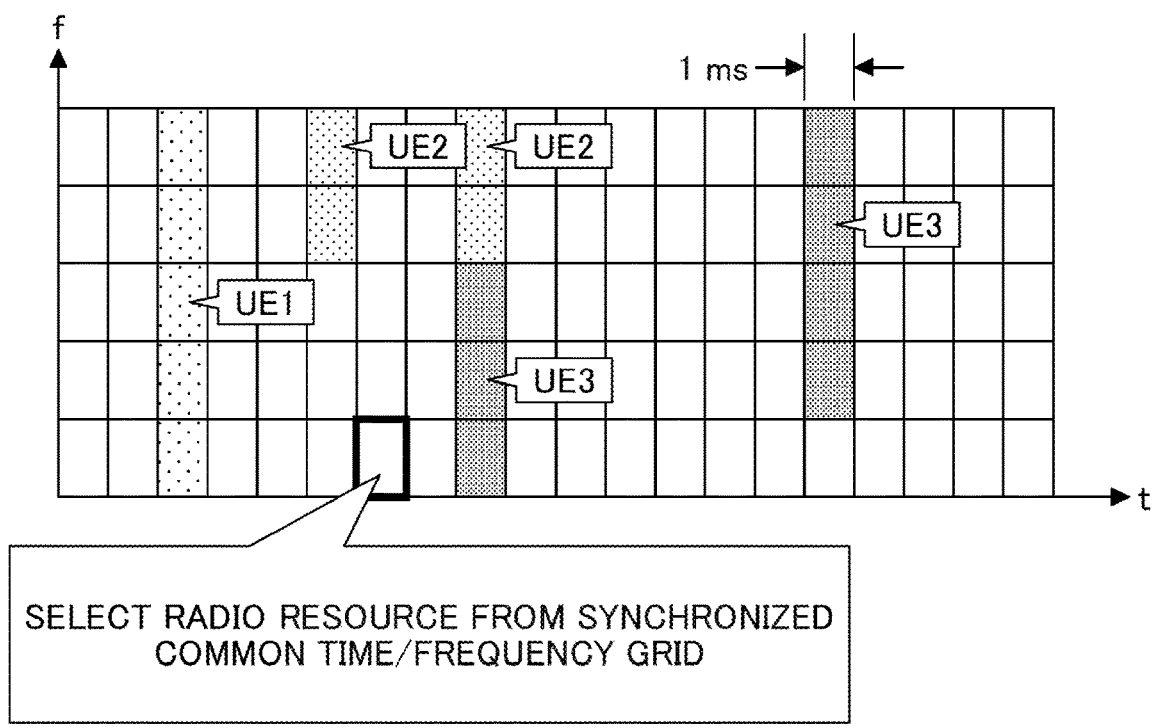
FIG. 7 is a diagram for illustrating a resource selection operation of a terminal.

As illustrated in FIG. 7, the terminal of the mode 4 (indicated by a UE in FIG. 7) selects a radio resource from a synchronized common time/frequency grid. For example, the terminal 20 performs sensing in the background, specifies resources which have a good sensing result and are not reserved for other terminals as candidate resources, and selects a resource to be used for transmission from the candidate resources.

(Overview of NR V2X)

In NR V2X, transmission modes are specified that are the same as SL transmission mode 3 and SL transmission mode 4 that are specified in LTE V2X. Here, a transmission mode may be replaced with a resource allocation mode, and the name is not limited to this.

In the following, an outline of transmission modes defined by NR V2X is described with reference to FIG. 8A to FIG. 8D.

Figure 8A:
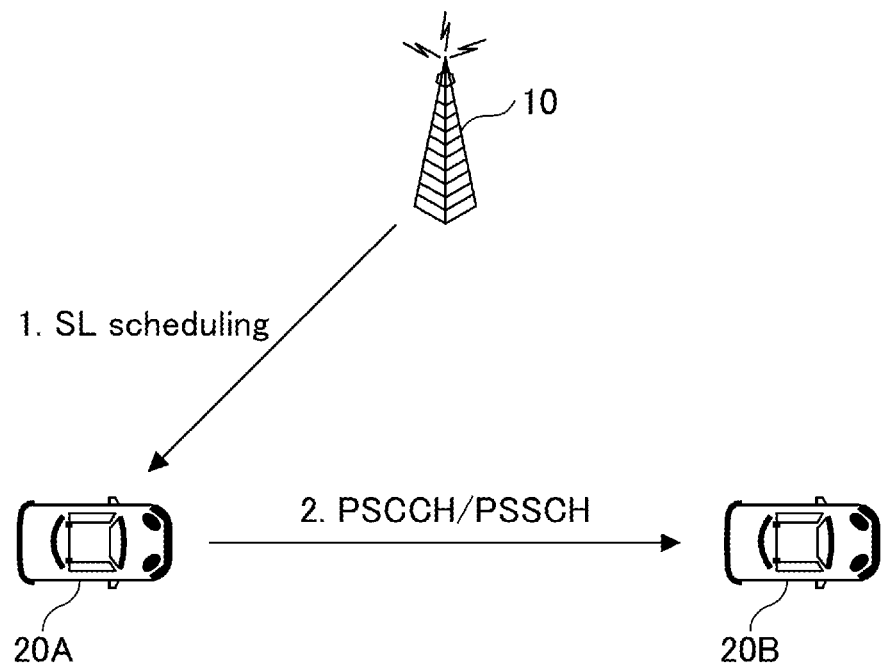
FIG. 8A is a diagram illustrating an outline of SL transmission mode 1 specified in NR V2X.

FIG. 8A is a diagram illustrating an overview of SL transmission mode 1 specified in NR V2X. SL transmission mode 1 specified in NR V2X corresponds to SL transmission mode 3 specified in LTE V2X. In the SL transmission mode 1 specified in NR V2X, the base station 10 schedules a transmission resource and assigns the transmission resource to the transmitting terminal 20A. The terminal 20A transmits a signal to the receiving terminal 20B by using the assigned transmission resource.

Figure 8B:
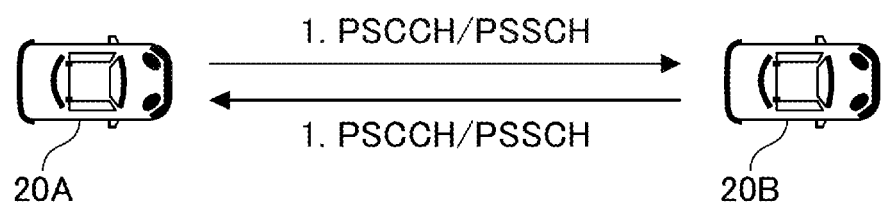
Figure 8C:
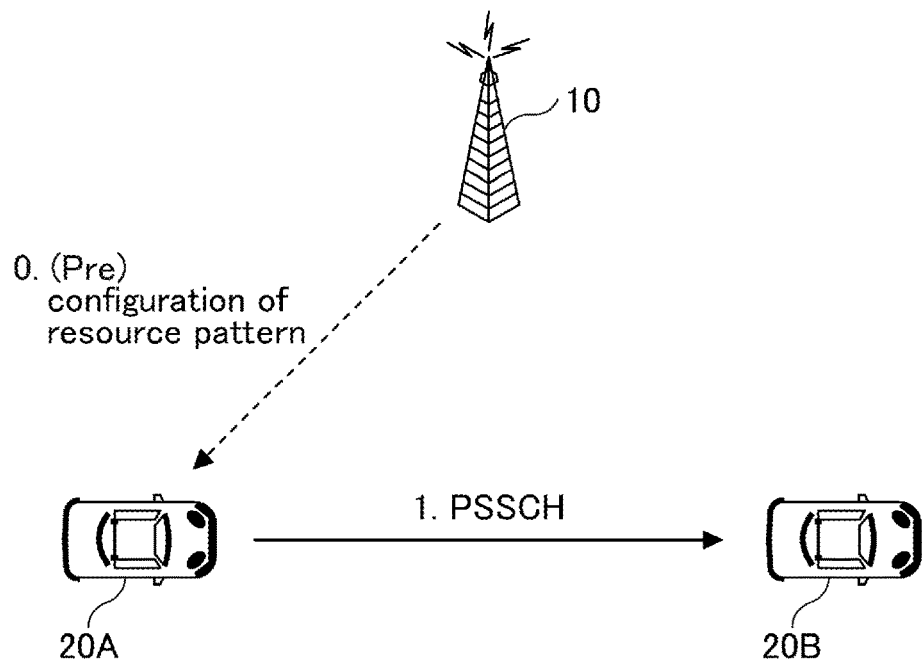
FIG. 8C is a diagram illustrating an outline of SL transmission mode 2c.
Figure 8D:
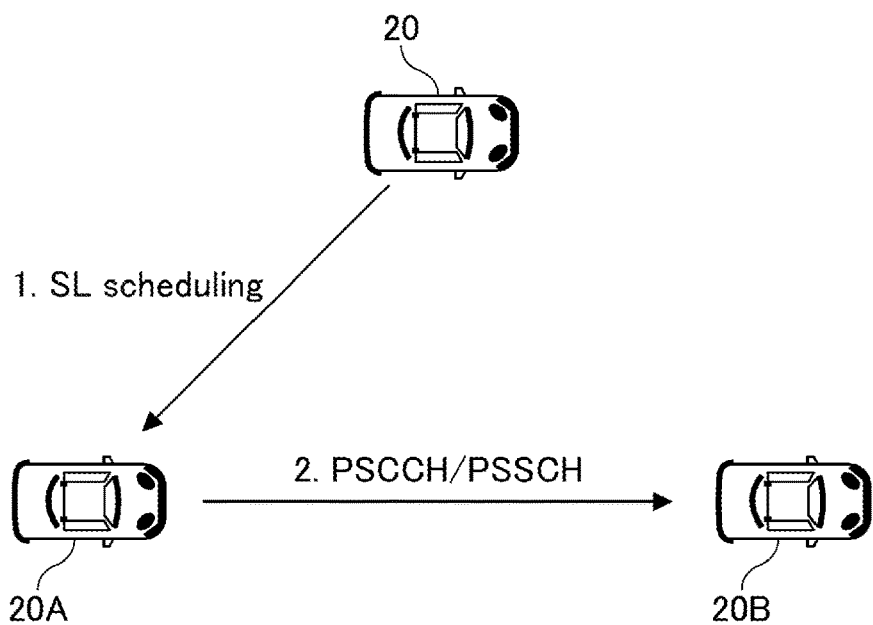
FIG. 8D is a diagram illustrating an outline of SL transmission mode 2d.

FIG. 8B, FIG. 8C, and FIG. 8D are diagrams illustrating an overview of SL transmission mode 2 as specified in NR V2X. SL transmission mode 2 specified in NR V2X corresponds to SL transmission mode 4 specified in LTE V2X.

FIG. 8B is a diagram illustrating an overview of SL transmission mode 2a. In SL transmission mode 2a, for example, the transmitting terminal 20A autonomously selects a transmission resource and transmits a signal to the receiving terminal 20B by using the selected transmission resource.

FIG. 8C is a diagram illustrating an outline of SL transmission mode 2c. In the SL transmission mode 2c, for example, the base station 10 preconfigures transmitting resources with a certain period to the terminal 20A, and the terminal 20A transmits a signal to the receiving terminal 20B by using the transmitting resources with the predetermined period. Here, instead of the base station 10 preconfiguring the transmitting resources with the certain period to the terminal 20A, for example, the transmitting resources with the certain period may be configured to the terminal 20A according to a technical specification.

FIG. 8D is a diagram illustrating an overview of SL transmission mode 2d. In SL transmission mode 2d, for example, the terminal 20 performs an operation that is the same as an operation of the base station 10. Specifically, the terminal 20 schedules transmission resources and assigns the transmission resources to the transmitting terminal 20A. The terminal 20A may perform a transmission to a receiving terminal 20B by using the assigned communication resources. Namely, the terminal 20 may control a transmission by another terminal 20.

Figure 9A:
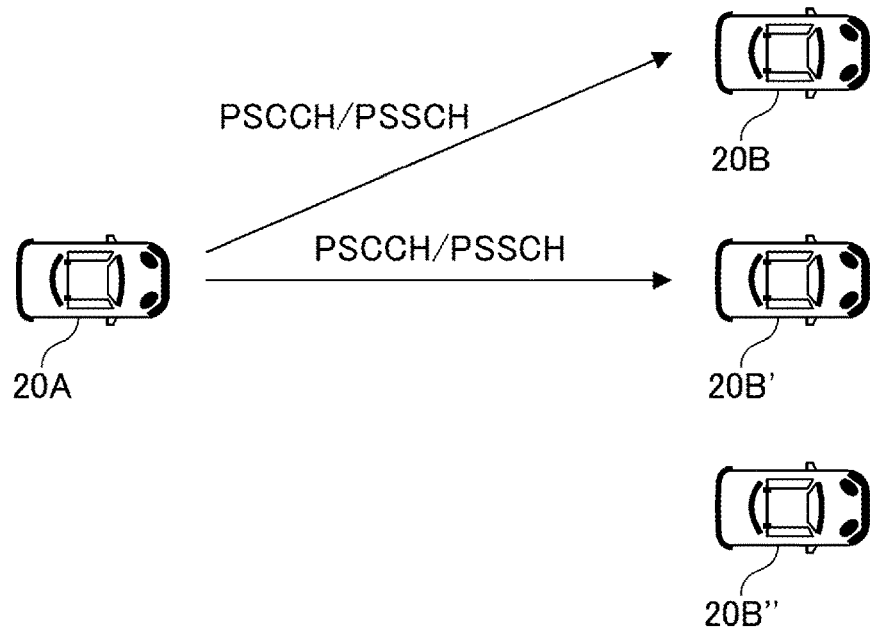
FIG. 9A is a diagram illustrating an example of a unicast PSCCH/PSSCH transmission.
Figure 9B:
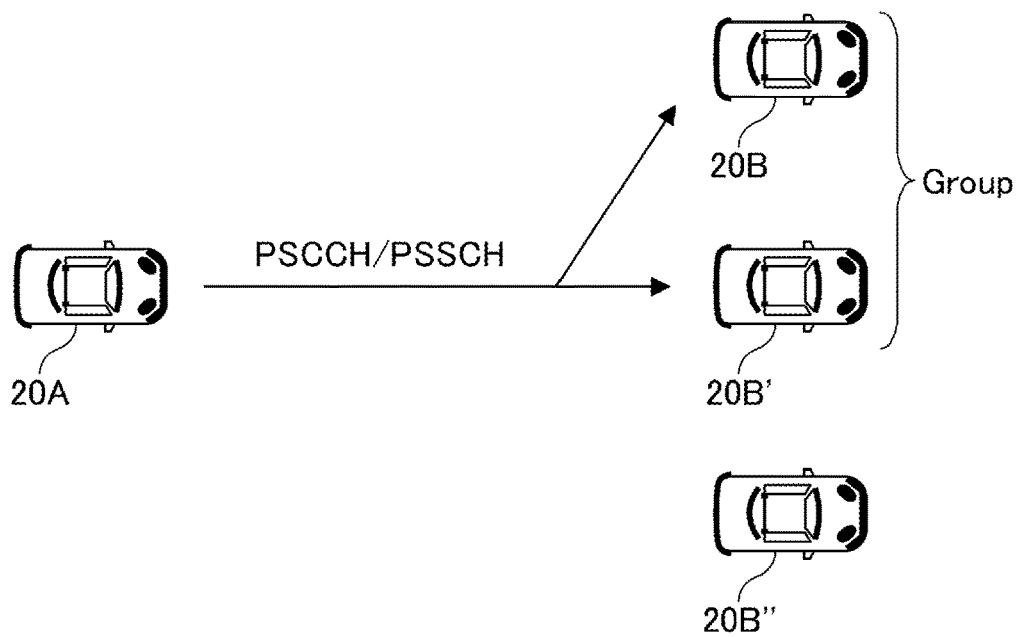
FIG. 9B is a diagram illustrating an example of a groupcast PSCCH/PSSCH transmission.
Figure 9C:
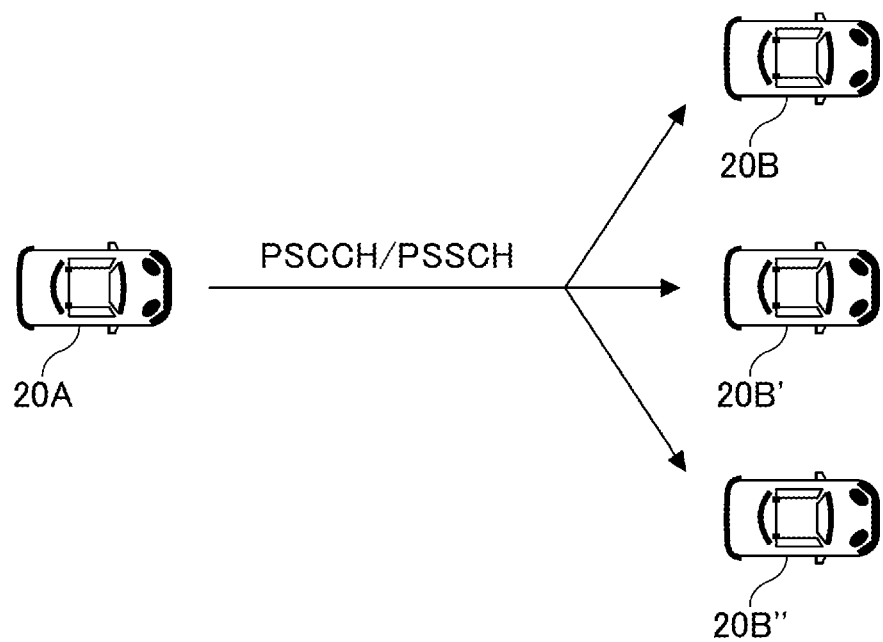
FIG. 9C is a diagram illustrating an example of a broadcast PSCCH/PSSCH transmission.

In the NR, as illustrated in FIG. 9A through FIG. 9C, three communication types, which are unicast, groupcast, and broadcast, are currently studied, as types of communication.

FIG. 9A is a diagram illustrating an example of unicast Physical Sidelink Shared Channel (PSCCH)/Physical Sidelink Control Channel (PSSCH) transmission. Unicast refers, for example, to a one-to-one transmission from the transmitting terminal 20A to the receiving terminal 20B.

FIG. 9B is a diagram illustrating an example of groupcast PSCCH/PSSCH transmission. A groupcast, for example, refers to a transmission from the transmitting terminal 20A to the terminal 20B and a receiving terminal 20B', which are a group of the receiving terminals 20.

FIG. 9C is a diagram illustrating an example of a broadcast PSCCH/PSSCH transmission. Broadcast refers, for example, to a transmission from the transmitting terminal 20A to the terminal 20B, the terminal 20B', and a terminal 20B" which are all the receiving terminals 20 within a predetermined range.

In New Radio (NR)-Sidelink (SL) of Release 16 of Third Generation Partnership Project (3GPP), feedback of Hybrid Automatic Repeat Request (HARQ) is assumed to be supported.

Configured grant (CG) is assumed to be introduced to NR sidelink communication. In the CG, the base station 10 configures a periodic sidelink radio resource (time and frequency resource) for the terminal 20, and the terminal 20 can transmit data to a receiving terminal 20 by using the configured periodic sidelink radio resource.

In Release 15 NR, Type 1 configured grant and Type 2 configured grant have been introduced for NR-Uu (an interface between a 5G user equipment and a 5G Radio Access Network (RAN)).

In the Type1 CG, a periodic radio resource is configured for the terminal 20 by a higher layer parameter (in a semi-static manner), and the terminal 20 can transmit data by using the configured periodic radio resource, without receiving a DCI for assigning a radio resource. The radio resource may be usable until the configuration is changed by RRC-reconfiguration.

In the Type2 CG, a periodic radio resource is configured for the terminal 20 by a higher layer parameter, and the terminal 20 can activate or deactivate (release) the periodic radio resource based on the received Downlink Control Information (DCI).

The Type1 CG and the Type2 CG are assumed to be also applied to NR sidelink communication.

Figure 10:
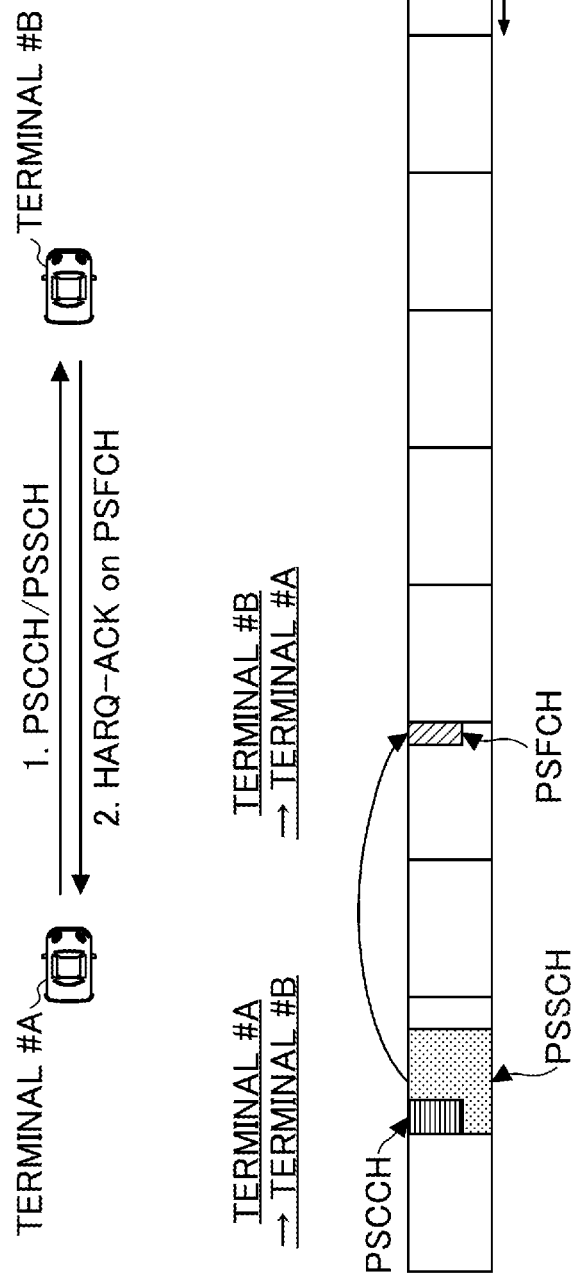
FIG. 10 is a diagram illustrating an example of HARQ in sidelink communication.

For sidelink communication of Release 16 NR, Hybrid Automatic Repeat Request (HARQ) is assumed to be introduced. HARQ-Acknowledgement (HARQ-ACK) is transmitted by using Physical Sidelink Feedback Channel (PSFCH). As illustrated in FIG. 10, a terminal 20A performs transmission to a terminal 20B on Physical Sidelink Control Channel (PSCCH)/Physical Sidelink Shared Channel (PSSCH), and in response, the terminal 20B transmits HARQ-ACK to the terminal 20A on PSFCH. As illustrated in FIG. 10, PSFCH may be mapped onto one or more symbols at the end of a slot with regard to time. In time domain, a PSFCH resource is associated with PSCCH and/or PSSCH, and, thus, it need not be assumed that a PSFCH resource is dynamically indicated in the time domain. Here, a method of determining a PSFCH resource is not limited to this.

Figure 11:
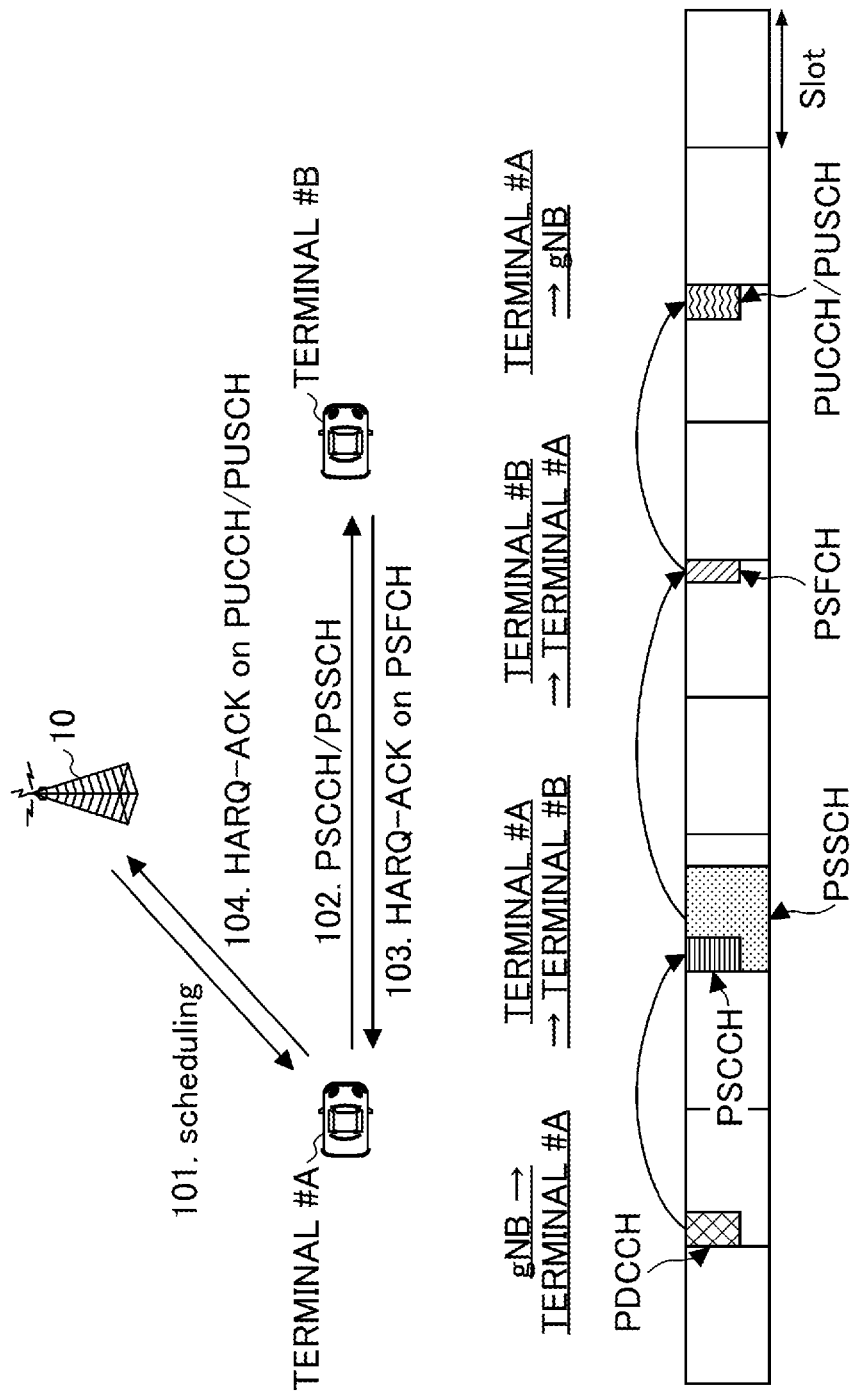
FIG. 11 is a diagram illustrating an example in which a transmitting terminal transmits sidelink HARQ-ACK to a base station 10.

For SL transmission mode 1 specified in NR V2X, as illustrated in FIG. 11, the transmitting terminal 20 is assumed to transmit Sidelink HARQ-ACK to the base station 10 (gNB). More specifically, for example, as illustrated in FIG. 11, the base station 10 performs scheduling for the terminal #A, and the terminal #A transmits data to the terminal #B on PSCCH/PSSCH. The terminal #B performs feedback of data transmission on PSCCH/PSSCH to the terminal #A, and based on this, the terminal #A performs HARQ-ACK feedback to the base station 10. The present invention is not limited thereto, and is also applicable to a case where the terminal #B performs HARQ-ACK feedback to the base station 10.

(Problem)

There is a need for clarifying an operation for transmitting HARQ-ACK from the terminal 20 to the base station 10 when configured grant is applied and the above-described HARQ is applied in SL transmission mode 1 specified in NR V2X.

Figure 12:
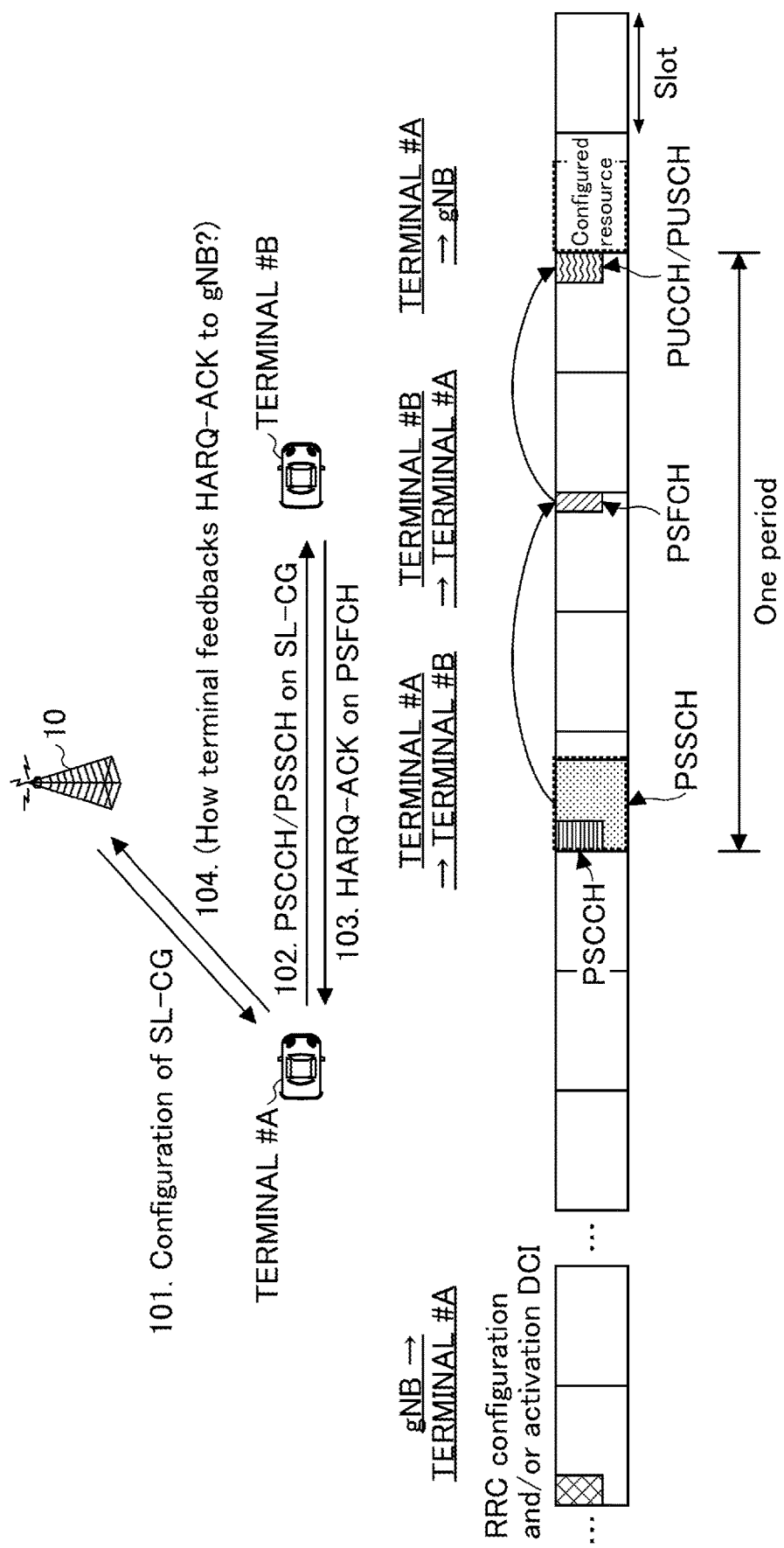
FIG. 12 is a diagram illustrating an example in which a configured grant is applied and HARQ is applied in SL transmission mode 1.

FIG. 12 is a diagram illustrating an example in which configured grant is applied and HARQ is applied in SL transmission mode 1. As illustrated in FIG. 12, in step 101, the base station 10 configures a configured grant (CG) for the terminal #A. In step 102, the terminal #A transmits data (for example, a transport block) to the terminal #B on a PSCCH/PSSCH resource corresponding to the configured CG. In step 103, the terminal #B transmits, on PSFCH to the terminal #A, HARQ-ACK in response to the transmission of data in step 102. In step 104, the terminal #A transmits HARQ-ACK to the base station 10. It should be noted that, based on the periodic resource configured in step 101, step 102 to step 104 are repeatedly performed. Activation of the CG by a DCI may be added between step 101 and step 102. Here, it is desired to define the resource in the time domain and the frequency domain for transmission of HARQ-ACK in step 104.

(Proposal A)

As a proposal A, a method for specifying a Physical Uplink Control Channel (PUCCH) resource for transmitting HARQ-ACK from the terminal #A to the base station 10 in step 104 of FIG. 12 is proposed. In the proposal A, a method is proposed that is for specifying a PUCCH resource in a slot for transmitting HARQ-ACK by the terminal #A. A method described below may be used for specifying a slot for transmitting HARQ-ACK by the terminal #A, or the slot may be specified by another method.

Specifically, for example, the terminal #A may transmit HARQ-ACK to the base station 10 on a PUCCH resource (or corresponding PUSCH resource) configured by a higher layer parameter. In the case of the Type2 CG, the base station 10 activates or deactivates a periodic radio resource by transmitting DCI to the terminal 20. A transmission of HARQ-ACK from the terminal 20 in response to data (for example, a transport block) communication on a CG resource immediately after this transmission of the DCI from the base station 10 may be excluded from the proposal A or may be included in the proposal A. In a case where this transmission is excluded from the proposal A, it may be assumed that the terminal 20 transmits HARQ-ACK on a PUCCH resource indicated by the DCI.

Here, as the method of proposal A, a method similar to a downlink semi-persistent scheduling (DL SPS) in Release 15 NR may be applied. In the case of the DL SPS in Release 15 NR, a PUCCH-ResourceId for transmitting HARQ-ACK corresponding to data transmission on a transmission resource configured by SPS-Config is indicated by n1PUCCH-AN included in SPS-Config.

(A1)

For example, the base station 10 may configure ConfiguredGrantConfig-sidelink including at least one n1PUCCH-AN as a higher layer parameter. The ConfiguredGrantConfig-sidelink may be a parameter for configuring sidelink configured grant for the terminal 20. It should be noted that the name "ConfiguredGrantConfig-sidelink" is merely an example, and the name of a parameter for configuring the sidelink configured grant for the terminal 20 is not limited to this example.

The base station 10 may include, in ConfiguredGrantConfig-sidelink, n1PUCCH-AN and any one or more of the following parameters. It should be noted that the names of the parameters included in ConfiguredGrantConfig-sidelink are merely examples, and the names thereof are not limited thereto.

Resources in the time domain and the frequency domain
timeDomainOffset: indicating an offset of a resource with reference to Subframe Number (SFN)=0 or D2D Frame Number (DFN)=0 in time domain
Periodicity: indicating periodicity of sidelink CG resource
repK: the number of repetitions of the configured resource within one period
Uci-OnPUSCH: indicating a value of beta-offset for Uci-OnPUSCH
ConfiguredGrantTimer (A2)

The n1PUCCH-AN included in the ConfiguredGrantConfig-sidelink may specify PUCCH-ResourceId for transmitting HARQ-ACK corresponding to the data transmission on a resource configured by the ConfiguredGrantConfig-sidelink, or may be associated with a certain PUCCH resource.

(A3)

The n1PUCCH-AN may specify PUCCH-ResourceId with PUCCH format0 or PUCCH format1. In either of these cases, for example, the following conditions may be added.

If a transmission of a PSSCH (transport block) based on a code block group (CBG) is not configured or indicated, and/or if a transmission of PSSCH based on a CBG is configured but HARQ-ACK bits corresponding to PSSCH transmitted on a sidelink CG resource are up to 2 bits, and/or if each HARQ-ACK corresponding to PSSCH of a sidelink CG resource is transmitted separately to the base station 10, the n1PUCCH-AN may specify PUCCH-ResourceId with PUCCH format0 or PUCCH format1.
Otherwise, the n1PUCCH-AN may specify PUCCH-ResourceId with PUCCH format2, PUCCH format3, or PUCCH format4.

(A4)

Two or more higher layer parameters may be specified as n1PUCCH-AN. For example, n1PUCCH-AN-1 and n1PUCCH-AN-2 may be specified as n1PUCCH-AN. For example, between n1PUCCH-AN-1 and n1PUCCH-AN-2, n1PUCCH-AN-1 may specify PUCCH-ResourceId with PUCCH format0 or PUCCH format1 (i.e., PUCCH format capable of transmitting up to 2 bits). Additionally, for example, between n1PUCCH-AN-1 and n1PUCCH-AN-2, n1PUCCH-AN-2 may specify PUCCH-ResourceId with PUCCH format2, PUCCH format3, or PUCCH format4 (i.e., PUCCH format capable of transmitting up to 3 bits or more). Additionally, if a transmission of a PSSCH based on a code block group (CBG) is not configured or indicated, and/or if a transmission of PSSCH based on a CBG is configured but HARQ-ACK bits corresponding to PSSCH on a sidelink CG resource are up to 2 bits, and/or if each HARQ-ACK corresponding to PSSCH on a sidelink CG resource is transmitted separately to the base station 10, the n1PUCCH-AN-1 may be used to transmit HARQ-ACK corresponding to data transmission on a resource configured by ConfiguredGrantConfig-sidelink. Otherwise, n1PUCCH-AN-2 may be used to transmit HARQ-ACK corresponding to data transmission on a resource configured by ConfiguredGrantConfig-sidelink.

Figure 13:
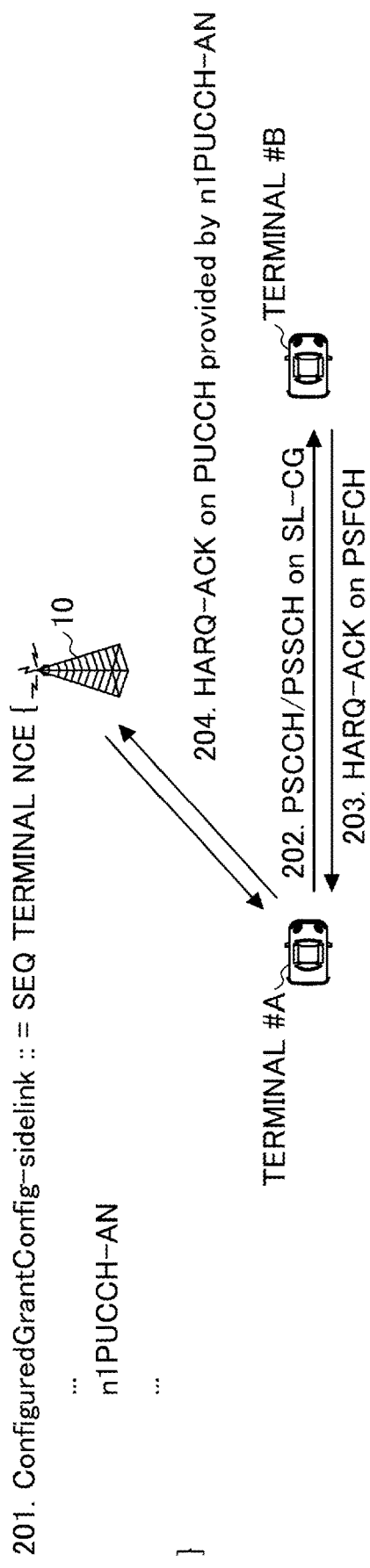
FIG. 13 is a diagram illustrating an example of proposal A.

FIG. 13 is a diagram illustrating an example of proposal A. As illustrated in FIG. 13, in step 201, the base station 10 configures a configured grant (CG) by transmitting a higher layer parameter ConfiguredGrantConfig-sidelink including n1PUCCH-AN to the terminal A. In step 202, the terminal #A transmits data to the terminal #B on a PSCCH/PSSCH resource corresponding to the configured CG. In step 203, the terminal #B transmits, to the terminal #A on PSFCH, HARQ-ACK corresponding to the data transmission in step 202. In step 204, the terminal #A transmits HARQ-ACK to the base station 10. Here, the terminal #A transmits HARQ-ACK to the base station 10 by using a PUCCH resource indicated by n1PUCCH-AN included in ConfiguredGrantConfig-sidelink transmitted in step 201.

In a case where the proposal A is adopted, a mechanism similar to DL SPS is applied, and, thus, it is expected that implementation of the terminal 20 becomes easy.

HARQ-ACK bits corresponding to data (for example, a transport block) communication on a CG resource immediately after transmission of DCI for activating a periodic sidelink radio resource might be multiplexed with HARQ-ACK bits corresponding to DL transmission and/or HARQ-ACK bits corresponding to sidelink communication on a resource other than that of the CG. Since the PUCCH resource for multiplexing and transmission is the resource indicated by the last DCI, a transmission of HARQ-ACK bits corresponding to data (for example, a transport block) communication on a CG resource immediately after the transmission of the DCI for the activation is preferably indicated dynamically based on the DCI. In contrast, if a transmission of HARQ-ACK bits corresponding to data (for example, a transport block) communication on a CG resource other than the CG resource immediately after the transmission of the DCI for the activation is to be multiplexed with HARQ-ACK bits corresponding to DL transmission and/or HARQ-ACK bits corresponding to sidelink communication on a resource other than that of CG, dynamic indication is not necessary because the last DCI is DCI other than the activation DCI. Accordingly, the method of proposal A can be applied so that a PUCCH resource used can be indicated by a different method in accordance with whether it is immediately after the activation of a periodic sidelink radio resource.

(Proposal B)

A PUCCH resource indicated by a DCI for activating a periodic sidelink radio resource (or a PUSCH resource corresponding to the PUCCH) may be continuously used as a resource for transmitting HARQ-ACK from the terminal 20 to the base station 10.

(B1)

Since it is assumed that a DCI for activating a periodic sidelink radio resource is used only for the Type2 CG, proposal B may be applied to the Type2 CG, and proposal A may be applied to the Type1 CG.

(B2)

By a DCI for activating a periodic sidelink radio resource, a single PUCCH resource may be indicated from a PUCCH resource set. In this case, the PUCCH resource indicated by the DCI may be used as a resource for transmitting the HARQ-ACK from the terminal 20 to the base station 10. Here, the PUCCH resource set may be the same as a PUCCH resource set used to transmit HARQ-ACK for data (for example, a transport block) transmitted on a dynamically scheduled sidelink resource, or may be the same as a PUCCH resource set used to transmit HARQ-ACK for a DL transmission, or may be different from a PUCCH resource set used to transmit HARQ-ACK for a DL transmission.

Figure 14:
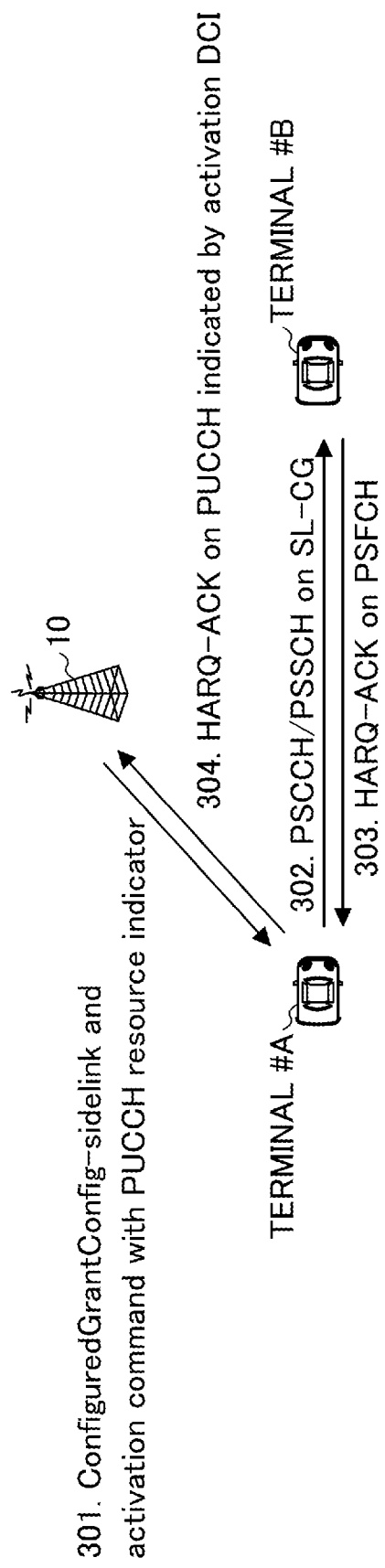
FIG. 14 is a diagram illustrating an example of proposal B.

FIG. 14 is a diagram illustrating an example of proposal B. As illustrated in FIG. 14, in step 301, the base station 10 configures a configured grant (CG) by transmitting a higher layer parameter ConfiguredGrantConfig-sidelink to the terminal #A, and transmits a DCI that is for activation of the CG and that includes a PUCCH resource indicator to the terminal #A. In step 302, the terminal #A transmits data to the terminal #B on a PSCCH/PSSCH resource corresponding to the configured CG. In step 303, the terminal #B transmits, on PSFCH to the terminal #A, HARQ-ACK for transmission of data in step 302. In step 304, the terminal #A transmits HARQ-ACK to the base station 10. Here, the terminal #A transmits HARQ-ACK to the base station 10 by using the PUCCH resource indicated by the PUCCH resource indicator included in the DCI transmitted in step 301.

According to the method of proposal B, a PUCCH resource can be indicated more flexibly. Since, according to the method of proposal B, a PUCCH resource can be indicated more flexibly, the method of the proposal B is effective in a case where, for example, HARQ-ACK for a transmission based on a sidelink CG is transmitted to the base station 10 without being multiplexed with other HARQ-ACK (for example, HARQ-ACK of NR-Uu).

(Proposal C)

The terminal 20 may avoid transmitting, to the base station 10, HARQ-ACK corresponding to data transmission on a sidelink CG resource that is without corresponding PDCCH. In this case, the terminal 20 may transmit, in a PUCCH resource indicated by PDCCH (or a PUSCH resource corresponding to the PUCCH resource), HARQ-ACK corresponding to data transmission on a sidelink CG resource corresponding to a PDCCH (for example, DCI for activating a periodic sidelink radio resource).

Figure 15:
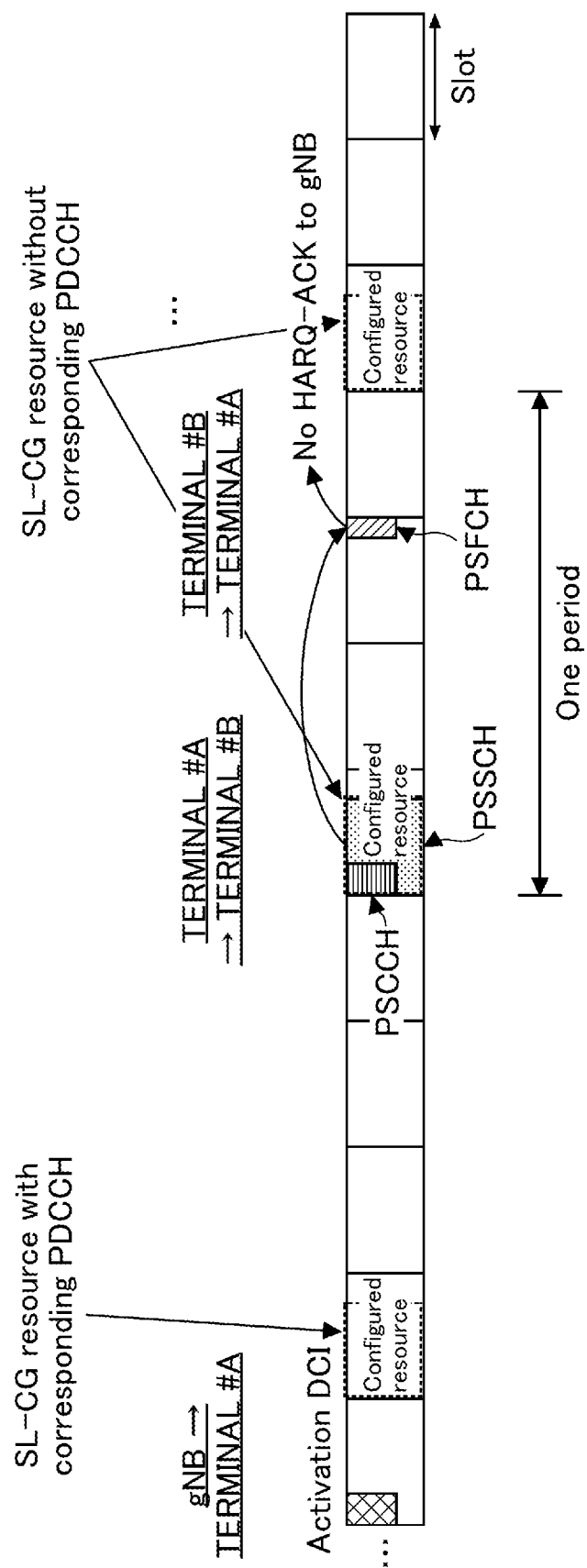
FIG. 15 is a diagram illustrating an example of proposal C.

FIG. 15 is a diagram illustrating an example of proposal C. FIG. 15 indicates that the terminal 20A does not transmit, to the base station 10, HARQ-ACK corresponding to data transmission on a sidelink CG resource that is without corresponding PDCCH. In this manner, for example, the terminal 20 does not transmit, to the base station 10, HARQ-ACK corresponding to data (for example, a transport block) transmission on a sidelink CG resource that is without corresponding PDCCH, so that in the SL transmission mode 1, a technical specification and operation of the terminal 20 where a configured grant is applied can be clarified and simplified.

(Proposal D)

The terminal 20 may transmit, with a PUCCH resource included in a slot indicated by the base station 10, HARQ-ACK corresponding to data transmission on a Sidelink CG resource that is without corresponding PDCCH. The proposal D is a method for specifying a slot in which the HARQ-ACK is to be transmitted, and the method for specifying a PUCCH resource in the slot may be the proposal A and/or the proposal B or may be another method. A slot for transmitting HARQ-ACK corresponding to data transmission on a sidelink CG resource with corresponding PDCCH may be indicated by the same method. According to the method of proposal D, the base station 10 and the terminal 20 can have common recognition regarding timing for transmitting HARQ-ACK (for example, a slot), and HARQ-ACK for data (for example, transport block) transmission on a CG resource can be transmitted to the base station 10 appropriately.

(D1)

On a PUCCH resource included in a slot indicated by a DCI for activating a periodic sidelink radio resource, the terminal 20 may transmit, to the base station 10, HARQ-ACK corresponding to data transmission on a sidelink CG resource that is without corresponding PDCCH.

(Option 1)

Figure 16:
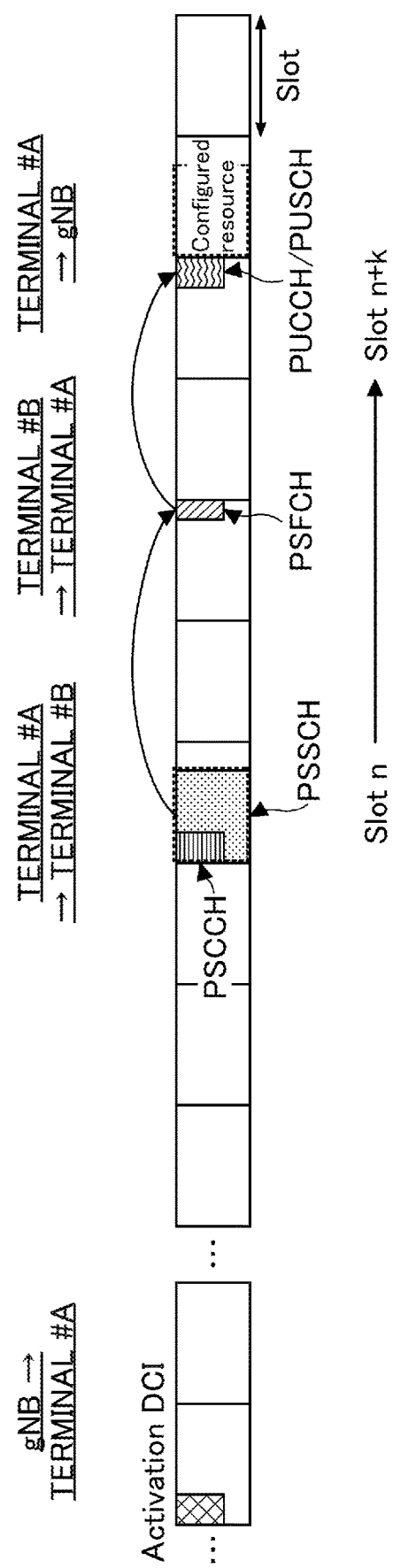
FIG. 16 is a diagram illustrating an example of proposal D.

FIG. 16 is a diagram illustrating an example of proposal D. As illustrated in FIG. 16, it is assumed that the terminal 20 performs, in a slot n, PSCCH/PSSCH transmission on a sidelink CG resource that is without corresponding PDCCH. In this case, on a PUCCH included in a slot n+k (or corresponding PUSCH), the terminal 20 may transmit HARQ-ACK corresponding to PSCCH/PSSCH transmission to the base station 10. Here, k may be indicated in a PSCCH-to-HARQ-timing indicator field or a PSSCH-to-HARQ-timing indicator field included in a DCI format for activating a periodic sidelink radio resource.

(Option 2)

Figure 17:
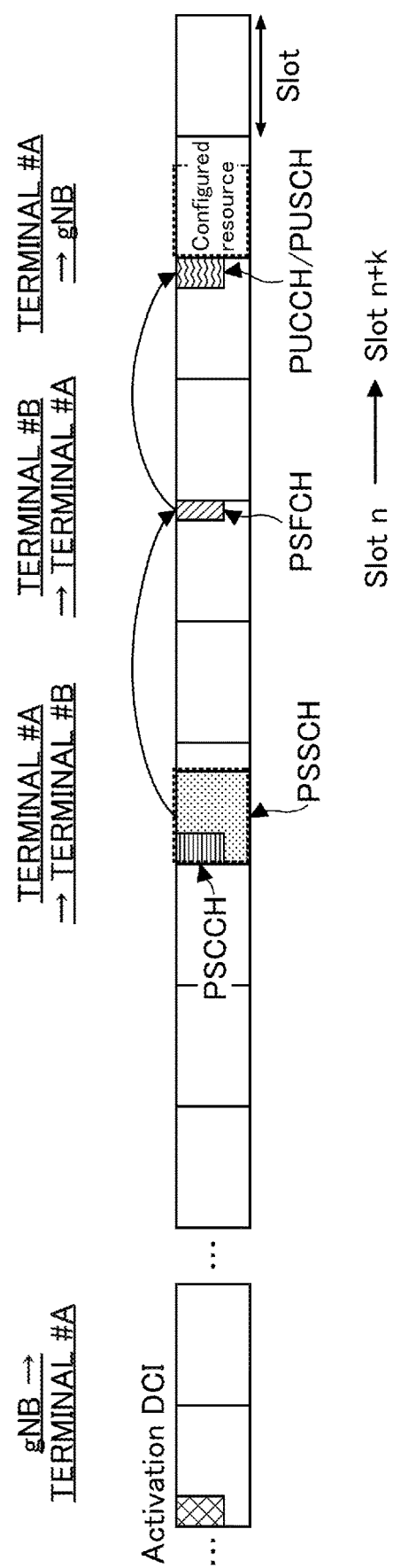
FIG. 17 is a diagram illustrating another example of proposal D.

FIG. 17 is a diagram illustrating another example of the proposal D. As illustrated in FIG. 17, it is assumed that the terminal 20 performs, in a slot n, reception (reception of sidelink HARQ-ACK from the terminal 20B) on PSFCH corresponding to PSCCH/PSSCH transmission on a sidelink CG resource that is without corresponding PDCCH. In this case, in a PUCCH (or corresponding PUSCH) included in a slot n+k, the terminal 20 may transmit, to the base station 10, HARQ-ACK corresponding to PSCCH/PSSCH transmission. Here, k may be indicated in a PSFCH-to-HARQ-timing indicator field included in a DCI format for activating a periodic sidelink radio resource.

(Option 3)

Figure 18:
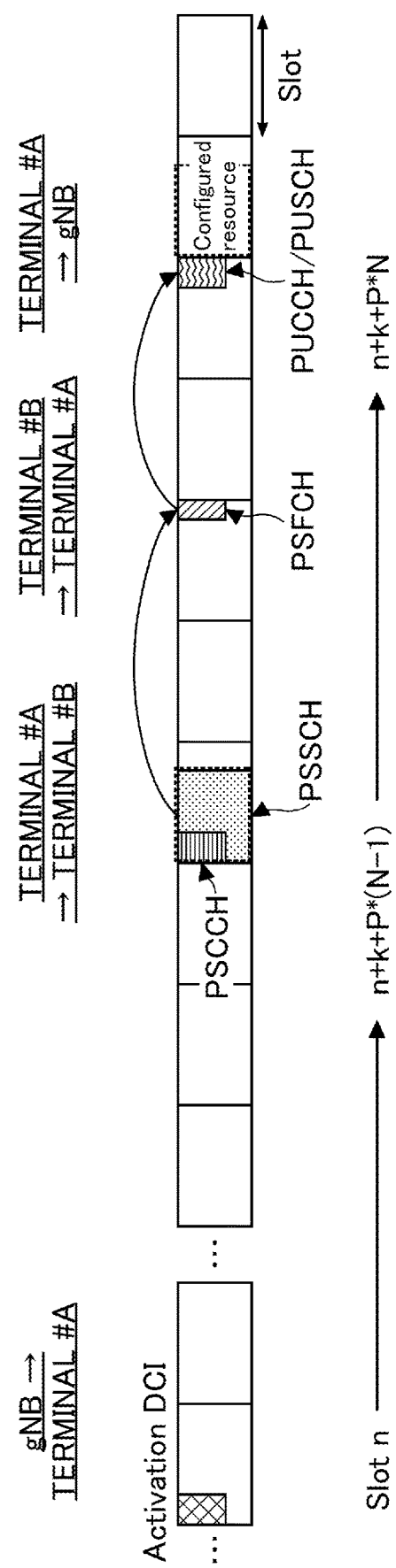
FIG. 18 is a diagram illustrating another example of proposal D.

FIG. 18 is a diagram illustrating another example of the proposal D. As illustrated in FIG. 18, it is assumed that the terminal 20 receives, in a slot n, a DCI for activating a periodic sidelink radio resource. In this case, the terminal 20 may perform, in a slot n+k+P×N, transmission of HARQ-ACK corresponding to PSCCH/PSSCH transmission. Herein, k may be indicated in a PDCCH-to-HARQ-timing indicator field included in a DCI format for activating a periodic sidelink radio resource. P may be a periodicity of CG of sidelink. N may be the number of transmission occasions on a sidelink CG resource after activation. It should be noted that N may indicate the number of transmission occasions in a time direction. Alternatively, N may indicate the number of transmission occasions in a time direction and a frequency direction (which can be sub-channels) (in this case, the above numerical expression indicating the slot may be modified as necessary). Alternatively, it may be a slot obtained by adding an offset value to the above-described n+k+P×N.

(D2)

On a PUCCH resource included in a slot indicated by a higher layer parameter, the terminal 20 may transmit, to the base station 10, HARQ-ACK corresponding to data transmission of a sidelink CG resource that is without corresponding PDCCH.

(Option 1)

It is assumed that the terminal 20 performs, in a slot n, PSCCH/PSSCH transmission on a sidelink CG resource that is without corresponding PDCCH. In this case, on a PUCCH resource included in the slot n+k (or corresponding PUSCH resource), the terminal 20 may transmit HARQ-ACK corresponding to PSCCH/PSSCH transmission to the base station 10. Here, k may be indicated by a higher layer parameter.

(Option 2)

It is assumed that the terminal 20 performs, in a slot n, reception (reception of HARQ-ACK of sidelink from the terminal 20B) on PSFCH corresponding to PSCCH/PSSCH transmission on a sidelink CG resource that is without corresponding PDCCH. In this case, on a PUCCH resource included in the slot n+k (or corresponding PUSCH resource), the terminal 20 may transmit HARQ-ACK corresponding to PSCCH/PSSCH transmission to the base station 10. Herein, k may be indicated by a parameter in a higher layer.

(Proposal E) If the base station 10 configures a sidelink CG for the terminal 20 and/or if a sidelink CG resource is activated, the terminal 20 shall transmit HARQ-ACK to the base station 10 (i.e., the terminal shall transmit HARQ-ACK to gNB) on a configured or indicated PUCCH resource (or corresponding PUSCH resource) irrespective of whether a sidelink channel transmission is performed on a sidelink CG resource.

Here, if the terminal 20 does not perform a sidelink channel transmission on a sidelink CG resource, the base station 10 will be unable to recognize that the terminal 20 is not performing a sidelink channel transmission on the sidelink CG resource. In this case, if the terminal 20 does not transmit HARQ-ACK, the base station 10 may erroneously determine that reception of HARQ-ACK fails. In such case, the base station 10 may determine that the base station 10 has failed to receive negative acknowledgement (NACK), and may dynamically assign an additional sidelink resource to the terminal 20. However, the terminal 20 is simply not performing a sidelink channel transmission on a sidelink CG resource, and such an assignment of an additional sidelink resource is unnecessary. In order to prevent such an assignment of an additional sidelink resource, the method of proposal E may be applied.

(E1)

In a case where the terminal 20 does not perform a sidelink channel transmission on a sidelink CG resource, the terminal 20 may transmit, as HARQ-ACK, positive acknowledgement (ACK) on a configured PUCCH resource or an indicated PUCCH resource.

Figure 19:
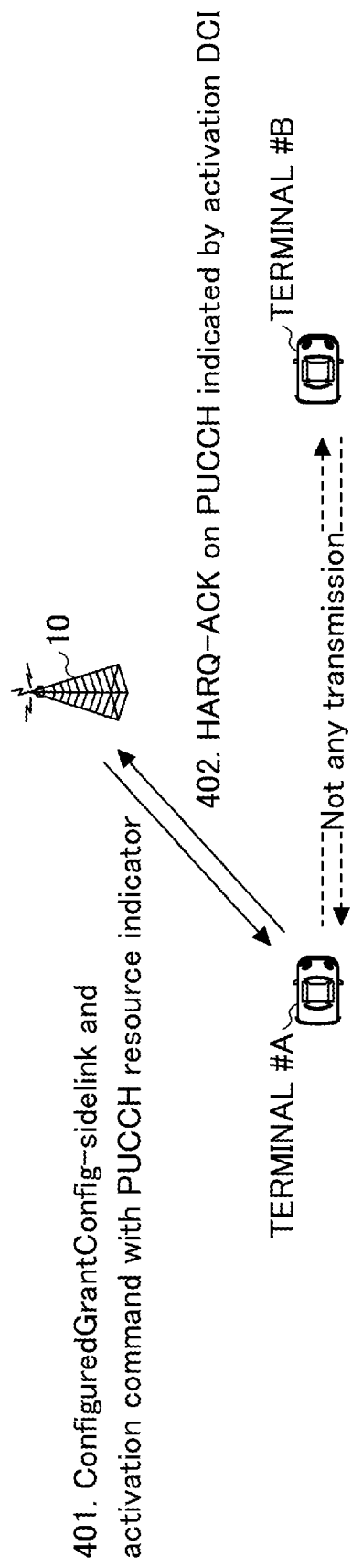
FIG. 19 is a diagram illustrating an example of proposal E1.

FIG. 19 is a diagram illustrating an example of a proposal E1. In step 401, the base station 10 configures a configured grant (CG) by transmitting a higher layer parameter ConfiguredGrantConfig-sidelink to the terminal #A, and transmits, to the terminal #A, DCI for CG activation and including a PUCCH resource indicator. However, for example, because of reasons such as non-existence of data to be transmitted, the terminal #A does not perform sidelink data transmission to the terminal 20B. Accordingly, in step 402, on a PUCCH resource indicated by the DCI, the terminal #A transmits, as HARQ-ACK, an acknowledgement (ACK) to the base station 10.

Different Proposals (Proposals A to E) and/or different Options may be applied to the Type1 CG and the Type2 CG.

In the above-described embodiments, different carriers may be applied to Uu and sidelink. Additionally or alternatively, in the above-described embodiments, different Numerologies may be applied to Uu and sidelink.

Here, if different carriers and different Numerologies are applied to Uu and sidelink, the parameters n, k, P, N in the above-described embodiments may be configured with reference to Uu or may be configured with reference to sidelink. In counting the number of slots, a different numerology results in a change in numbers to be counted, and, thus, it is assumed that it may be necessary to define whether to make configuration with reference to Uu or with reference to sidelink.

(Alt1)

In the case of Option 1 of D1, the parameters n, k, P, N in the above-described embodiments may be configured based on a PUCCH carrier. For example, if a subcarrier spacing (SCS) of a PSCCH/PSSCH carrier is larger than a subcarrier spacing of a PUCCH carrier, and if HARQ-ACK of PSCCH/PSSCH having a large subcarrier spacing is transmitted to the base station 10 with a carrier having a subcarrier spacing smaller than the subcarrier spacing of PSCCH/PSSCH, k=0 may correspond to a slot for a small subcarrier spacing overlapping a slot in which PSCCH/PSSCH transmission is performed. For example, if a subcarrier spacing (SCS) of a PSCCH/PSSCH carrier is smaller than a subcarrier spacing of a PUCCH carrier, and HARQ-ACK of PSCCH/PSSCH having a small subcarrier spacing is transmitted to the base station 10 by a carrier having a subcarrier spacing larger than the subcarrier spacing of PSCCH/PSSCH, k=0 may correspond to a slot of which end boundary in a time direction is aligned to the slot for the corresponding PSCCH/PSSCH.

(Alt2)

In the case of the Option 1 of D1, the parameters n, k, P, N may be configured based on a carrier of PSCCH/PSSCH in the above-described embodiments.

(Alt3)

In the case of the Option 1 of D1, the parameters n, k, P, N may be configured based on a PSFCH carrier in the above-described embodiments.

(Alt4)

In the case of the Option 1 of D1, the parameters n, k, P, N may be configured based on a PDCCH carrier in the above-described embodiments.

(Device Configuration)

Next, a functional configuration example of each of the base station 10 and the terminal 20 for executing the processes and the operation described so far is described.

<Base Station 10>

Figure 20:
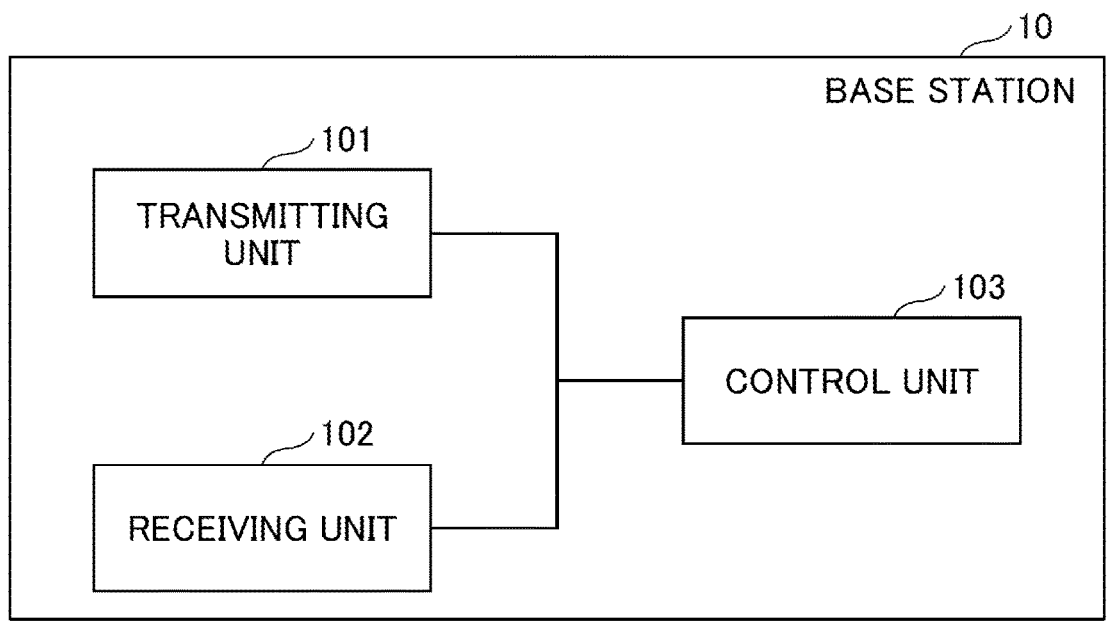
FIG. 20 is a diagram illustrating an example of a functional configuration of a base station according to an embodiment.

FIG. 20 is a diagram illustrating an example of a functional configuration of the base station 10. As illustrated in FIG. 20, the base station 10 includes a transmitting unit 101, a receiving unit 102, and a control unit 103. The functional configuration illustrated in FIG. 20 is only an example. As long as the operation according to the embodiments can be executed, the functional division and the name of the functional unit may be any division and name. Furthermore, the transmitting unit 101 may be referred to as a transmitter, and the receiving unit 102 may be referred to as a receiver.

The transmitting unit 101 has a function of generating a signal to be transmitted to the terminal 20 side and transmitting the signal wirelessly. The receiving unit 102 has a function of receiving various types signals transmitted from the terminal 20 and acquiring, for example, information of an upper layer from the received signals. Furthermore, the receiving unit 102 has a function of measuring the received signal and acquiring a quality value.

The control unit 103 controls the base station 10. The function of the control unit 103 related to transmission may be included in the transmitting unit 101, and the function of the control unit 103 related to reception may be included in the receiving unit 102.

For example, the control unit 103 of the base station 10 configures, for the terminal 20, a periodic resource for sidelink communication (configured grant (CG)), and the control unit 103 generates a message for specifying the configured periodic resource for the sidelink communication. The transmitting unit 101 transmits the message to the terminal 20.

When a slot for transmitting HARQ-ACK from the terminal 20 to the base station 10 is specified, the control unit 103 of the base station 10 may generate a higher layer parameter for specifying, within the slot, a PUSCH resource for transmitting the HARQ-ACK to the base station 10, and the transmitting unit 101 may transmit the higher layer parameter to the terminal 20.

Furthermore, the control unit 103 of the base station 10 may include, in DCI for activation of a periodic sidelink radio resource, information for specifying a PUCCH resource for transmitting HARQ-ACK from the terminal 20 to the base station 10, and the transmitting unit 101 may transmit the DCI to the terminal 20.

Furthermore, for Type1 CG, the control unit 103 of the base station 10 may generate a higher layer parameter for specifying a PUCCH resource for transmitting, to the base station 10, HARQ-ACK within a slot, and the control unit 103 of the base station 10 may cause the transmitting unit 101 to transmit the higher layer parameter to the terminal 20. Additionally, for Type2 CG, the control unit 103 of the base station 10 may include, in DCI for activation of a periodic sidelink radio resource, information for specifying a PUCCH resource for transmitting HARQ-ACK from the terminal 20 to the base station 10, and the control unit 103 of the base station 10 may cause the transmitting unit 101 to transmit the DCI to the terminal 20.

Furthermore, the control unit 103 of the base station 10 may configure a slot for transmitting, from the terminal 20 to the base station 10, HARQ-ACK corresponding to data transmission on a sidelink CG resource that is without corresponding PDCCH, and the control unit 103 of the base station 10 may configure a PUCCH resource included in the slot.

<Terminal 20>

Figure 21:
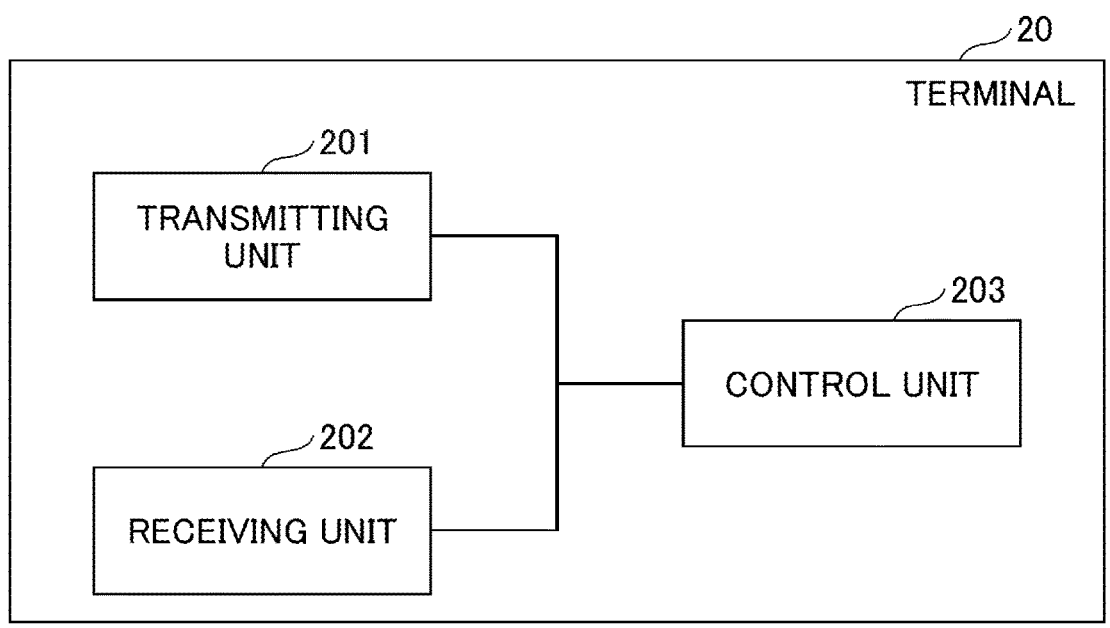
FIG. 21 is a diagram illustrating an example of a functional configuration of a terminal according to an embodiment.

FIG. 21 is a diagram illustrating an example of a functional configuration of the terminal 20. As illustrated in FIG. 21, the terminal 20 includes a transmitting unit 201, a receiving unit 202, and a control unit 203. The functional configuration illustrated in FIG. 21 is only an example. As long as the operation according to the embodiments can be executed, the functional division and the name of the functional unit nay be any division and name. Furthermore, the transmitting unit 201 may be referred to as a transmitter, and the receiving unit 202 may be referred to as a receiver. Furthermore, the terminal 20 may be the terminal 20A on the transmission side or the terminal 20B on the reception side. Furthermore, the terminal 20 may be a scheduling terminal 20.

The transmitting unit 201 generates a transmission signal from transmission data and transmits the transmission signal wirelessly. The receiving unit 202 wirelessly receives various types of signals, and acquires a signal of an upper layer from the received signal of the physical layer. Furthermore, the receiving unit 202 has a function of measuring the received signal and acquiring a quality value.

The control unit 203 controls the terminal 20. Note that, the function of the control unit 203 related to transmission may be included in the transmitting unit 201, and the function of the control unit 203 related to reception may be included in the receiving unit 202.

For example, the receiving unit 202 of the terminal 20 receives a signal including a higher layer parameter including configuration information for a configured grant (CG) that is configuration information of a resource for sidelink periodic data transmissions transmitted from the base station 10. The control unit 203 of the terminal 20 configures the CG in accordance with the configuration information of the CG included in the received higher layer parameter. The transmitting unit 201 of the terminal 20 performs sidelink data transmission by using the configured resource of the CG.

For example, when a slot for transmitting HARQ-ACK from the terminal 20 to the base station 10 is specified, the receiving unit 202 of the terminal 20 may receive a higher layer parameter including information for specifying a PUCCH resource for transmitting the HARQ-ACK from the terminal 20 to the base station 10. In response to receiving sidelink HARQ-ACK by the receiving unit 202 of the terminal 20, the control unit 203 of the terminal 20 may generate HARQ-ACK to be transmitted to the base station 10, which corresponds to the sidelink HARQ-ACK, and the transmitting unit 201 of the terminal 20 may transmit the HARQ-ACK corresponding to the sidelink HARQ-ACK to the base station 10 by using the PUCCH resource specified by the information included in the higher layer parameter.

Furthermore, the receiving unit 202 of the terminal 20 receives DCI for activation of a resource for periodic sidelink data transmissions, and the control unit 203 of the terminal 20 may configure a PUCCH resource specified by the DCI as a resource for transmitting HARQ-ACK from the terminal 20 to the base station 10.

Furthermore, the control unit 203 of the terminal 20 may configure, for a Type1 CG, a PUCCH resource for transmitting HARQ-ACK from the terminal 20 to the base station 10 specified by a higher layer parameter received from the base station 10 by the receiving unit 202, and the transmitting unit 201 of the terminal 20 may transmit, to the base station 10, the HARQ-ACK by using the configured PUCCH resource. Furthermore, the control unit 203 of the terminal may configure, for a Type2 CG, a PUCCH resource for transmitting HARQ-ACK from the terminal 20 to the base station 10 in accordance with information included in DCI for activation of a periodic sidelink radio resource received from the base station 10 by the receiving unit 202, and the transmitting unit 201 of the terminal 20 may transmit, to the base station 10, the HARQ-ACK by using the configured PUCCH resource.

Furthermore, the control unit 203 of the terminal 20 may determine not to transmit, to the base station 10, HARQ- ACK corresponding to data transmission on a sidelink CG resource that is without corresponding PDCCH.

The control unit 203 of the terminal 20 may configure a PUCCH resource included in a slot specified by the base station 10, as a resource for transmitting, to the base station 10, HARQ-ACK corresponding to a data transmission on a sidelink CG resource that is without corresponding PDCCH.

Furthermore, when the base station 10 configures sidelink CG for the terminal 20, and/or when a sidelink CG resource is activated, the control unit 203 of the terminal 20 configures a PUCCH resource (or a corresponding PUSCH resource) regardless of whether a sidelink channel transmission is performed on the sidelink CG resource, and the transmitting unit 201 of the terminal 20 transmits the HARQ-ACK to the base station 10.

<Hardware Configuration>

The block diagrams (FIG. 20 through FIG. 21) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 22:
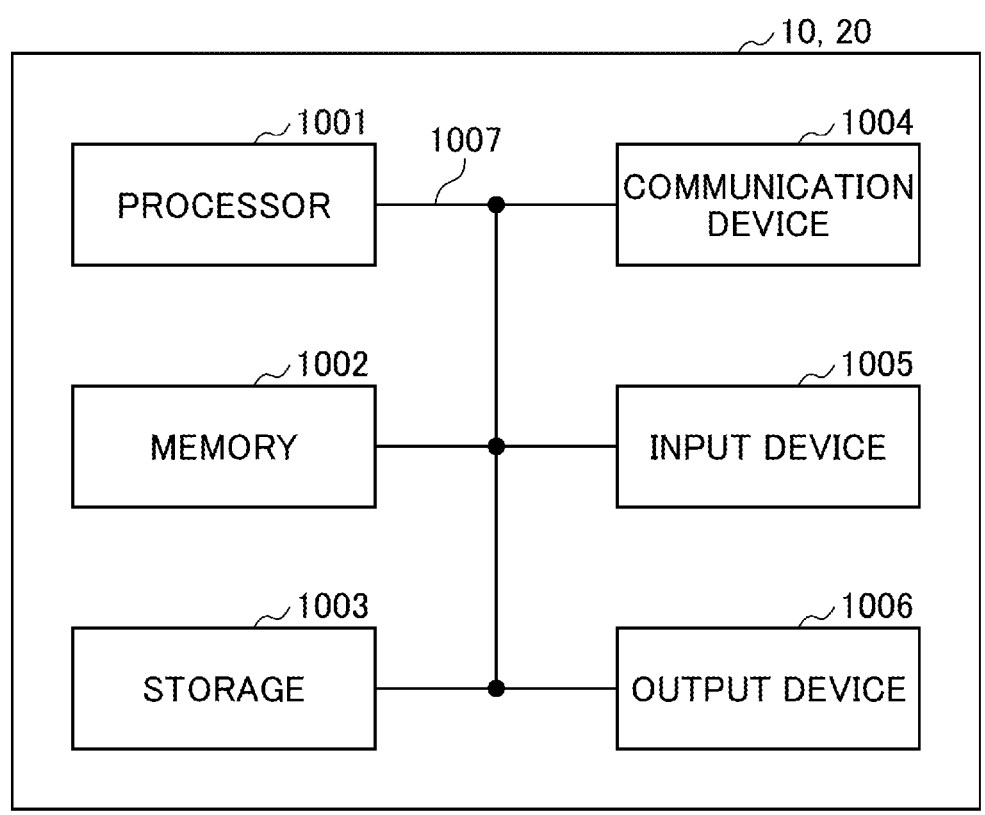
FIG. 22 is a diagram illustrating an example of a hardware configuration of the base station and the terminal according to an embodiment.

For example, the terminal 20 and the base station 10 in an embodiment of the present invention may function as a computer for performing a process of the embodiments. FIG. 22 is a diagram illustrating an example of a hardware configuration of the terminal 20 and the base station 10 according to an embodiment. Each of the terminal 20 and the base station 10 described above may be physically configured as a computer device including a processor 1001, a memory 1002, a storage 1003, a communication device 1004, an input device 1005, an output device 1006, a bus 1007, and the like.

In the following description, the term "device" can be replaced with a circuit, device, unit, or the like. The hardware configuration of each of the terminal 20 and the base station 10 may be configured to include one or more of devices represented by 1001 through 1006, which are depicted, or may be configured without including some devices.

Each function in each of the terminal 20 and the base station 10 is implemented such that predetermined software (program) is read on hardware such as the processor 1001, the memory 1002 and the like, and the processor 1001 performs an operation and controls communication by the communication device 1004 and at least one of reading and writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, data, or the like from at least one of the storage 1003 and the communication device 1004 out to the memory 1002, and executes various types of processes according to them. A program causing a computer to execute at least some of the operations described in the above embodiments is used as the program. For example, the control unit 203 of the terminal 20 may be implemented by a control program which is stored in the memory 1002 and operates on the processor 1001, and another functional block may be implemented similarly. Various types of processes are described to be executed by one processor 1001 but may be executed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 may also be referred to as a "register," a "cache," a "main memory," or the like. The memory 1002 can store programs (program codes), software modules, or the like which are executable for carrying out the radio communication method according to an embodiment of the present disclosure.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 may be referred to as an auxiliary storage device. The above-described storage medium may be, for example, a database, a server, or any other appropriate medium including at least one of the memory 1002 and the storage 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD).

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the memory 1002 are connected by the bus 1007 to communicate information with each other. The bus 1007 may be configured with a single bus or may be configured with different buses between the devices.

Furthermore, each of the terminal 20 and the base station 10 may be configured to include hardware such as a microprocessor, a digital signal processor (DSP: Digital Signal Processor), an application specific integrated circuit (ASIC), a programmable logic device (PLD), or a field programmable gate array (FPGA), or all or some of the functional blocks may be implemented by the hardware. For example, the processor 1001 may be implemented by at least one of these hardware components.

Conclusion of the Embodiments

In this specification, at least the following terminal and communication method are disclosed.

A terminal including a receiving unit configured to receive a signal from a base station; a control unit configured to configure a periodic sidelink resource for transmitting data on sidelink based on the signal received by the receiving unit, and to configure an uplink control channel resource for transmitting, to the base station, a first Hybrid Automatic Repeat Request (HARQ)-Acknowledgement (ACK) corresponding to a HARQ-ACK of a sidelink communication received by the receiving unit; and a transmitting unit configured to transmit the first HARQ-ACK on the uplink control channel resource configured by the control unit.

According to the above-described configuration, when a configured grant is applied in SL transmission mode 1 specified for NR V2X, and when the above-described HARQ is applied, a PUCCH resource for transmitting HARQ-ACK from the terminal 20 to the base station 10 is explicitly specified, and, thus, an operation for transmitting the HARQ-ACK from the terminal 20 to the base station 10 is clarified.

The control unit may configure the uplink control channel resource based on an identifier included in a higher layer parameter included in the signal received by the receiving unit. The control unit may set a timing of a slot included in the uplink control channel resource based on downlink control information received by the receiving unit.

The periodic sidelink resource may be a type 1 periodic sidelink resource continuously usable without receiving, by the receiving unit, downlink control information for assigning a radio resource, or may be a type 2 periodic sidelink resource continuously usable after performing activation by using control information received by the receiving unit, wherein, when the periodic sidelink resource is the type 1 periodic sidelink resource, the control unit may configure the uplink control channel resource based on an identifier included in a higher layer parameter included in the signal received by the receiving unit, and wherein, when the periodic resource is the type 2 periodic sidelink resource, the control unit may configure the uplink control channel resource based on the control information.

It is assumed that DCI for activating a sidelink periodic radio resource is used only for Type2 CG. According to the above-described configuration, an operation is allowed such that, for Type2 CG, a PUCCH resource indicated by DCI for activating a periodic sidelink radio resource is configured as a PUCCH resource for transmitting HARQ-ACK from the terminal to the base station, and, for Type1 CG, a PUCCH resource for transmitting HARQ-ACK from the terminal to the base station is configured in accordance with a higher layer parameter from the base station.

Upon detecting that a sidelink data transmission is not performed on one of sidelink resource in the periodic sidelink resource, the transmitting unit may transmit a second HARQ-ACK to the base station by using the uplink control channel resource configured by the control unit.

When the terminal does not perform a sidelink channel transmission on a CG resource, the base station may be unable to detect that the terminal does not perform the sidelink channel transmission on the sidelink CG resource. In this case, if the terminal does not transmit HARQ-ACK to the base station, the base station may erroneously determine that reception of the HARQ-ACK fails. In such a case, the base station may determine that reception of a negative acknowledgement (NACK) fails, and the base station may dynamically assign, to the terminal, an additional sidelink resource. However, the terminal merely does not perform a sidelink channel transmission on the sidelink CG resource, and, thus, such an assignment of an additional sidelink resource is unnecessary. According to the above-described configuration, such an assignment of an unnecessary sidelink resource can be prevented.

A communication method to be performed by a terminal, the method including receiving a signal from a base station; configuring a periodic sidelink resource for transmitting data on sidelink based on the received signal, and configuring an uplink control channel resource for transmitting, to the base station, a first Hybrid Automatic Repeat Request (HARQ)-Acknowledgement (ACK) corresponding to a HARQ-ACK of a received sidelink communication; and transmitting the first HARQ-ACK on the configured uplink control channel resource.

According to the above-described configuration, when a configured grant is applied in SL transmission mode 1 specified for NR V2X, and when the above-described HARQ is applied, a PUCCH resource for transmitting HARQ-ACK from the terminal 20 to the base station 10 is explicitly specified, and, thus, an operation for transmitting the HARQ-ACK from the terminal 20 to the base station 10 is clarified.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 20 and the base station 10 are described using the functional block diagrams, but such devices may be implemented by hardware, software, or a combination thereof. Software executed by the processor included in the terminal 20 according to the embodiments of the present invention and software executed by the processor included in the base station 10 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in the present disclosure may be reversed in order provided that there is no contradiction. For example, the method described in the present disclosure presents elements of various steps with an exemplary order and is not limited to a presented specific order.

In the present disclosure, a specific operation to be performed by the base station 10 may be performed by an upper node in some cases. In the network including one or more network nodes including the base station 10, various operations performed for communication with the terminal can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (true or false), or may be performed by a comparison of numerical values (for example, a comparison with a predetermined value).

The aspects/embodiments described in this disclosure may be used alone, in combination, or switched with implementation. Notification of predetermined information (e.g., "X" notice) is not limited to a method that is explicitly performed, and may also be made implicitly (e.g., "no notice of the predetermined information").

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message.

The terms "system" and "network" used in the present disclosure are used interchangeably. Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "Base Station (BS)," "radio base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "Mobile Station (MS)," "user terminal," "User Equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a terminal, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of Things (IoT) device such as a sensor.

Furthermore, the base station in the present disclosure may be replaced with a user terminal. For example, each aspect/embodiment of the present disclosure may be applied to a configuration in which communication between the base station and the user terminal is replaced with communication between a plurality of user terminals (for example, which may be referred to as Device-to-Device (D2D) or Vehicle-to-Everything (V2X)). In this case, the user terminal 20 may have the functions of the base station 10 described above. Furthermore, the terms "uplink" and "downlink" may be replaced with terms corresponding to inter-terminal communication (for example, "side"). For example, an uplink channel, a downlink channel, or the like may be replaced with side channels.

Similarly, the user terminal in the present disclosure may be replaced with the base station. In this case, the base station 10 may have the functions of the above-mentioned user terminal 20.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS (Reference Signal) and may be referred to as a pilot, depending on a standard to be applied.

A phrase "based on" used in the present disclosure is not limited to "based only on" unless otherwise stated. In other words, a phrase "based on" means both "based only on" and "based on at least."

In a case in which "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like.

The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names respectively corresponding to them may be used.

For example, one subframe may be referred to as a transmission time interval (TTI: Transmission Time Interval), or a plurality of consecutive subframes may be referred to as a TTI, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of assigning a radio resource (a frequency bandwidth, a transmission power, or the like which can be used in each user terminal) to each terminal in units of TTIs. The definition of the TTI is not limited thereto.

The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI.

Note that, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Note that, a long TTI (for example, a common TTI, a subframe, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. Each of one TTI, one subframe, or the like may be formed of one or more resource blocks.

Furthermore, one or more RBs may be referred to as a physical resource block (PRB: Physical RB), a subcarrier group (SCG: Subcarrier Group), a resource element group (REG: Resource Element Group), a PRB pair, an RB pair, or the like.

Furthermore, a resource block may be formed of one or more resource elements (RE: Resource Element). For example, one RE may be a radio resource region of one subcarrier and one symbol.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is plural.

In the present disclosure, a term "A and B are different" may mean "A and B are different from each other." Furthermore, the term may mean "each of A and B is different from C." Terms such as "separated," "coupled," or the like may also be interpreted in a manner similar to "different."

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS 10 base station
20 terminal
101 transmitting unit
102 receiving unit
103 control unit
201 transmitting unit
202 receiving unit
203 control unit
1001 processor
1002 memory
1003 storage
1004 communication device
1005 input device
1006 output device

The invention claimed is:

1. A terminal comprising:
a receiver configured to receive a higher layer parameter from a base station via Radio Resource Control (RRC) signaling;
a processor configured to configure a periodic sidelink resource for transmitting data on sidelink based on the higher layer parameter received by the receiver, and to configure an uplink control channel resource for transmitting, to the base station, a second Hybrid Automatic Repeat Request (HARQ)-Acknowledgement (ACK) corresponding to a first HARQ-ACK of a sidelink communication received by the receiver; and
a transmitter configured to transmit the second HARQ-ACK on the uplink control channel resource.

2. The terminal according to claim 1, wherein the processor is configured to configure the uplink control channel resource based on an identifier included in the higher layer parameter.

3. The terminal according to claim 2, wherein the higher layer parameter includes at least one of a period of a sidelink Configured Grant (CG) resource or an offset with respect to a system frame number (SFN) in a time domain.

4. The terminal according to claim 1, wherein the processor is configured to set a timing of a slot included in the uplink control channel resource based on downlink control information received by the receiver.

5. The terminal according to claim 4, wherein the timing of the slot is specified by a number of slots from a slot for receiving the first HARQ-ACK of the sidelink communication by the receiver.

6. The terminal according to claim 5, wherein the number of slots is specified by the downlink control information or the higher layer parameter.

7. The terminal according to claim 1, wherein, if a sidelink channel transmission in a sidelink Configured Grant (CG) resource is not performed, the transmitter is configured to transmit an ACK to the base station in the uplink control channel resource configured by the processor.

8. A communication method executed by a terminal, the method comprising:
   receiving a higher layer parameter from a base station via Radio Resource Control (RRC) signaling;
   configuring a periodic sidelink resource for transmitting data on sidelink based on the received higher layer parameter, and configuring an uplink control channel resource for transmitting, to the base station, a second Hybrid Automatic Repeat Request (HARQ)-Acknowledgement (ACK) corresponding to a received first HARQ-ACK of a sidelink communication received; and
   transmitting the second HARQ-ACK on the uplink control channel resource.

9. A communication system comprising:
   a terminal including:
      a receiver configured to receive a higher layer parameter from a base station via Radio Resource Control (RRC) signaling;
      a processor configured to configure a periodic sidelink resource for transmitting data on sidelink based on the higher layer parameter received by the receiver, and to configure an uplink control channel resource for transmitting, to the base station, a second Hybrid Automatic Repeat Request (HARQ)-Acknowledgement (ACK) corresponding to a first HARQ-ACK of a sidelink communication received by the receiver; and
      a transmitter configured to transmit the second HARQ-ACK on the uplink control channel resource; and
   a base station including a receiver configured to receive the second HARQ-ACK.

* * * * *